United States Patent
Kennedy et al.

(10) Patent No.: US 7,196,142 B2
(45) Date of Patent: Mar. 27, 2007

(54) POLYISOBUTYLENE-BASED BLOCK ANIONOMERS AND CATIONOMERS AND SYNTHESIS THEREOF

(75) Inventors: Joseph P. Kennedy, Akron, OH (US); Zheng Fang, Somerset, NJ (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 10/406,369

(22) Filed: Apr. 3, 2003

(65) Prior Publication Data

US 2003/0204022 A1 Oct. 30, 2003

Related U.S. Application Data

(60) Provisional application No. 60/370,003, filed on Apr. 4, 2002.

(51) Int. Cl.
C08F 293/00 (2006.01)
C08F 210/10 (2006.01)

(52) U.S. Cl. .................. 525/280; 525/95; 525/293; 525/309; 526/348.7; 526/86; 526/92; 526/170

(58) Field of Classification Search .............. 525/280, 525/309, 95, 293, 284, 319; 526/348.7, 86, 526/92, 170
See application file for complete search history.

(56) References Cited

U.S. PATENT DOCUMENTS

| | | | |
|---|---|---|---|
| 3,949,016 A | 4/1976 | Agouri et al. .......... 260/876 B |
| 4,942,204 A | 7/1990 | Kennedy ................... 525/293 |
| 5,073,381 A | 12/1991 | Ivan et al. .................. 424/487 |
| 6,200,589 B1 | 3/2001 | Kennedy et al. ............ 424/424 |
| 6,228,945 B1 * | 5/2001 | Kennedy et al. ............ 525/241 |
| 6,727,322 B2 * | 4/2004 | Kennedy et al. ............ 525/314 |

OTHER PUBLICATIONS

Jose-Luis M. Abboud and Rafael Notario, Juan Bertran and Miquel Sola, "One Century of Physical Organic Chemistry: The Menshutkin Reaction", in *Progress in Physical Organic Chemistry*, vol. 19, pp. 1-3, Feb. 1993.

Xuan Zhang, Jianhui Xia and Krzysztof Matyjaszewski, *Atom Transfer Radical Polymerization of Protected Methacrylic Acids*, Fall National AGS Meeting, pp. 440-441 (1999).

Xuan Zhang, Jianhui Xia and Krzysztof Matyjaszewski, *Controlled/ "Living" Radical Polymerization of 2-(Dimethylamine)ethyl Mehacrylate*, Macromolecules, vol. 31, pp. 5167-5169 (1998).

David M. Haddleton et al., *Atom Transfer Polymerization of Methyl Methacrylate Mediated by Alkylpyridylmethanimine Type Ligands, Copper(I) Bromide, and Alkyl Halides in Hydrocarbon Solution*, Macromolecules, vol. 32, pp. 2110-2119, 1999.

B. Keszler, Gy. Fenyvesi and J.P. Kennedy, *Novel Star-Block Polymers: Three Polyisobutylene-b-Poly(methyl methacrylate) Arms Radiating from an Aromatic Core*, Journal of Polymer Science: Part A: Polymer Chemistry, vol. 38, pp. 706-714, 2000.

* cited by examiner

*Primary Examiner*—James J. Seidleck
*Assistant Examiner*—Asinovsky Olga
(74) *Attorney, Agent, or Firm*—Roetzel & Andress; George W. Moxon, II

(57) ABSTRACT

Various novel block cationomers comprising polyisobutylene (PIB) and poly(2-dimethylamino)ethyl methacrylate) (PDMAEMA) segments have been synthesized and characterized. The specific targets were various molecular weight diblocks (PDMAEMA$^+$) and triblocks (PDMAEMA$^+$-b-PIB-b-PDMAEMA$^+$) with the PIB blocks in the $DP_n=50-200^-(M_n=3,000-9,000$ g/mol) range connected to blocks of PDMAEMA$^+$ cations in the $DP_n=5-20$ range. The overall synthetic strategy for the preparation of these block cationomers comprised four steps: 1) Synthesis by living cationic polymerization of mono- and di-allyltelechelic polyisobutylenes, 2) End group transformation to obtain PIBs fitted with termini capable of mediating the atom transfer radical polymerization (ATRP) of DMAEMA, 3) ATRP of DMAEMA and 4) Quaternization of PDMAEMA to PDMAEMA$^+$I$^-$ by CH$_3$I. Kinetic and model experiments provided guidance to develop convenient synthesis methods. The microarchitecture of PIB-PDMAEMA di- and triblock and the corresponding block cationomers were confirmed by $^1$H NMR and FTIR spectroscopy and solubility studies.

16 Claims, 12 Drawing Sheets

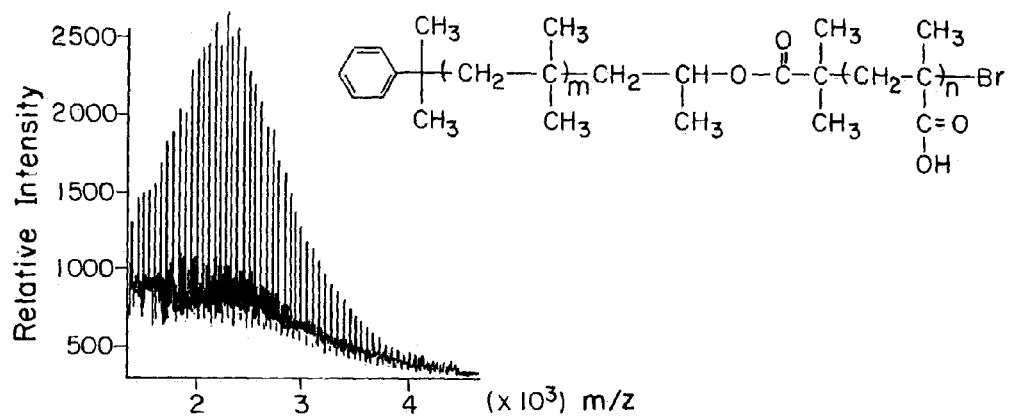
FIG.-8a
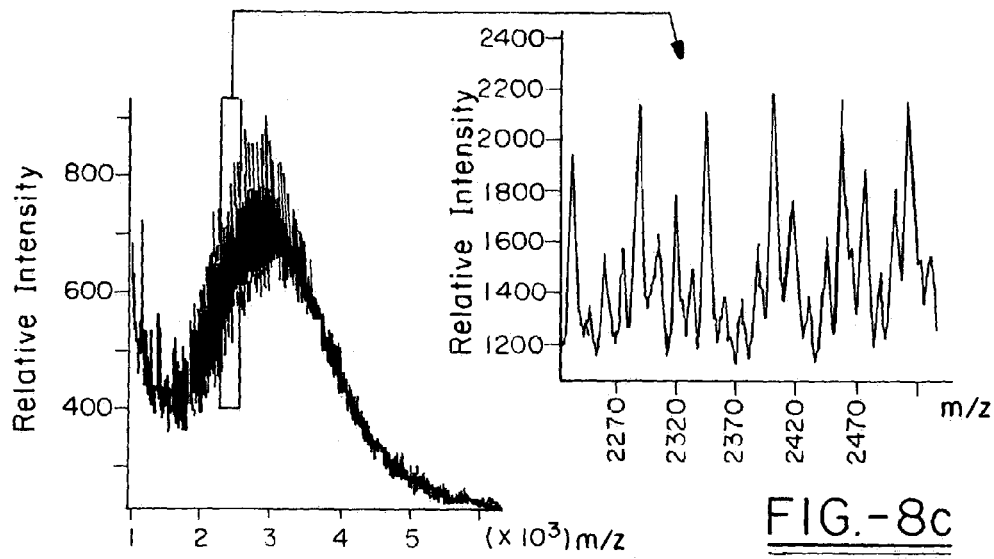
FIG.-8b
FIG.-8c
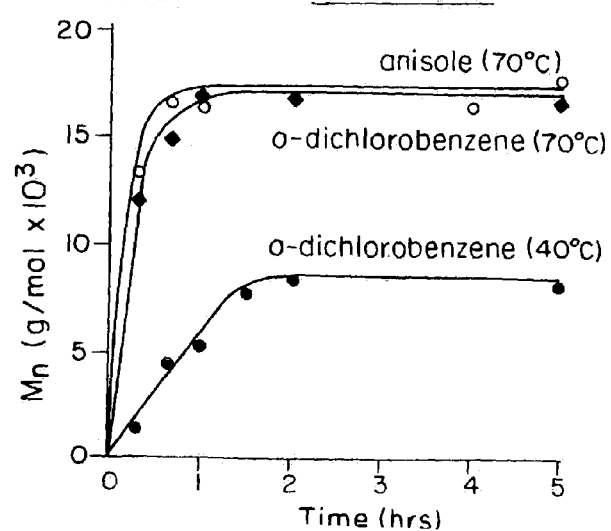
FIG.-9

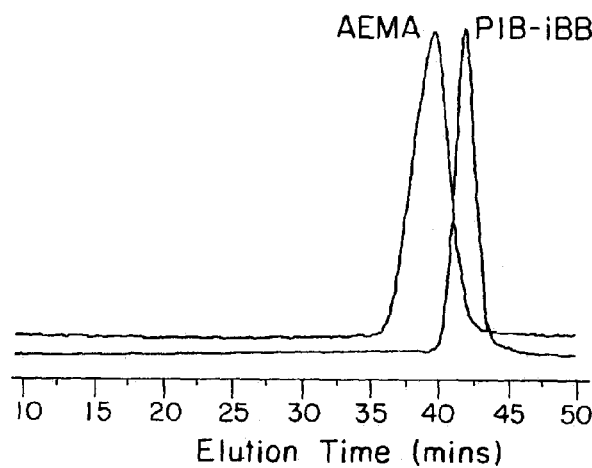
FIG.-11
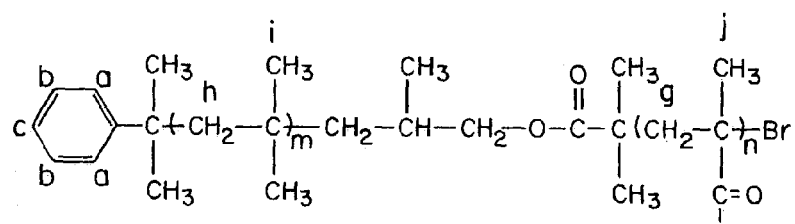
FIG.-12
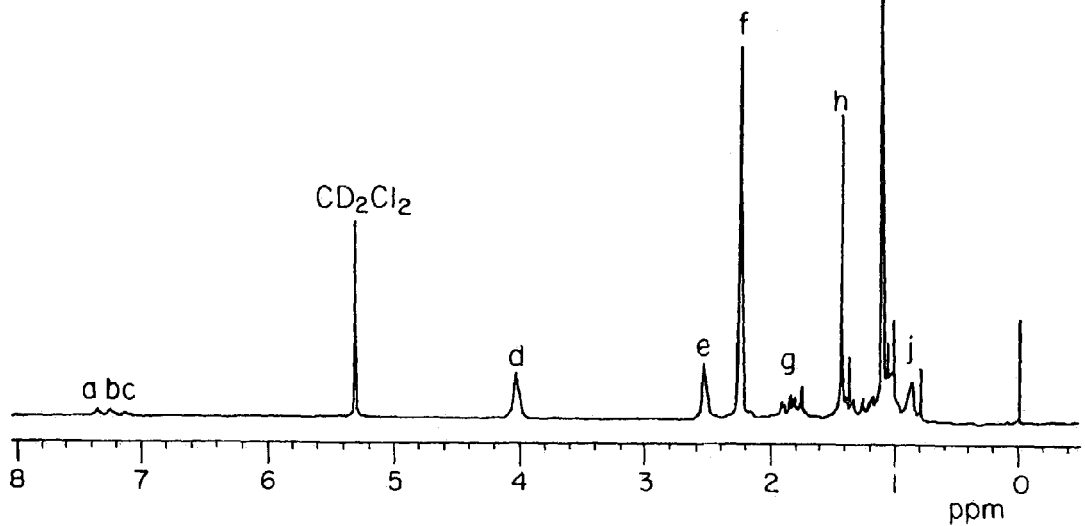

POLYISOBUTYLENE-BASED BLOCK ANIONOMERS AND CATIONOMERS AND SYNTHESIS THEREOF

This invention claims the benefit of U.S. Provisional Patent Application No. 60/370,003 filed Apr. 4, 2002.

The research disclosed in this application was at least partially supported by a grant from the National Science Foundation, and therefore, the U.S. Government may have certain rights to this invention.

TECHNICAL FIELD

This invention relates to block ionomers, and, more particularly, a method of synthesis of block copolymer ionomers.

BACKGROUND OF THE INVENTION

The synthesis of amphiphilic polymers, i.e., polymers that combine hydrophilic and hydrophobic moieties, has recently grown in interest to contemporary researchers for a variety of scientific and practical reasons.

The synthesis of block ionomers has gained interest and importance in a number of industries. Early work with DMAEMA is found in Kennedy, U.S. Pat. No. 4,942,204, and Ivan, et al., U.S. Pat. No. 5,073,381, both of which disclose free radical polymerization of methacryloyl end-capped polyisobutylene (MA-PIB-MA) with DMAEMA or hydroxyethyl methylmethacrylate (HEMA). The product of these inventions is a random amphiphilic network, capable of swelling with and absorbing up to about 170% of its weight in either a polar or non polar solvent, while remaining insoluble in either. Control of overall network molecular weight and concentration of one constituent within the copolymer network are significant parameters of this invention. The networks disclosed therein are intended to perform timed release of pharmaceuticals in vivo.

Matyjaszewski, U.S. Pat. No. 5,763,948 teaches atom transfer radical polymerization (ATRP) as a method of synthesizing low polydispersity (Mw/Mn) block copolymers via anionic polymerization. Such control over polydispersity is obtained through use of a transition metal catalyst which acts as a carrier of a halogen atom in a redox process. As the reaction proceeds, the molecular weight distribution of the copolymer product decreases, approaching 1.10. Typical monomers to be polymerized via ATRP include methacrylates, styrenes and dienes. However, this patent does not disclose the ionization of a methacrylate or amine after ATRP addition to a hydrophobic block. Further, this patent discloses that inasmuch as ATRP is radical polymerization, blocks can be prepared in essentially any order.

U.S. Pat. No. 6,069,205, to Wang, a former student of Professor Matyjaszewski, discloses polymerization of an ethylenically unsaturated monomer and a cationically polymerizable monomer through the ATRP process to form diblock or triblock copolymers. Many of the suitable unsaturated monomers are highly polar, such as 2-hydroxyethyl methacrylate. One stage in this polymerization is the conversion of terminal halogen atoms to hydroxyl or metal salts. The resultant copolymers of this invention have low polydispersities, in the range Mw/Mn=1.30 to 1.74.

Professor Matyjaszewski's latest ATRP method is disclosed in U.S. Pat. No. 6,162,882, which teaches processes for synthesizing homopolymers, graft copolymers or block copolymers of general type ABA wherein A is at least monofunctionalized and B is at least bifunctionalized. At least one of B's functional groups is a radically transferable atom or group. The improvement thereof over previous ATRP technology is the ability to polymerize polar monomers. As with previous ATRP work, molecular weight and polydispersity control are key objects of this invention; polydispersities as low as 1.04 are disclosed. Disclosed therein is a reaction scheme for the production of a block copolymer having methyl-methacrylate monomers and isobutylene monomers. Block copolymers having a polyisobutylene block also are possible. However, as thermoplastic polymers born of this method have blocks which are thermodynamically incompatible, such polymers exhibit two glass transition temperatures.

Building on prior work at the University of Akron, Kennedy, et al., U.S. Pat. No. 6,200,589, disclose semipermeable amphiphilic membranes capable of immunoisolation. This capability, which is manifest as selective permeability, and depends on the size of the target molecule, is necessary for the intended application. An exemplary application is an implant for long-term use as a reservoir for foreign cells performing a therapeutic function, such as the maintenance of transplanted islet of Langerhans cells releasing insulin in the treatment of Type I diabetes. The implant device contains both hydrophobic segments (radicalized polyolefins) and hydrophilic segments (polyacrylates).

Neither the scientific nor the patent literature contains any mention of block copolymers having a saturated rubber block and an ionomeric block, nor the quaternization or hydrolysis of such an ionomeric block.

It would be advantageous then, to provide a block ionomer having a saturated rubber block and an ionic block. Similarly, it would be advantageous to provide a method for synthesizing a block ionomer.

SUMMARY OF THE INVENTION

Thus, it is therefore, an aspect of the present invention to provide a block copolymer ionomer comprising a block of polyisobutylene, and at least one ionomeric block connected to the block of polyisobutylene.

It is another aspect of the present invention to provide a plurality of block copolymer ionomers forming an inverse micelle, wherein each block copolymer ionomer comprises a block of polyisobutylene and at least one ionomeric block connected to the block of polyisobutylene.

It is still another aspect of the present invention to provide a plurality of block copolymer ionomers forming an endless ionomer network, wherein each block copolymer ionomer comprises a block of polyisobutylene and two ionomeric blocks, each connected to the block of polyisobutylene It is yet another aspect of the present invention to provide a plurality of star block copolymer ionomers forming an endless ionomer network, wherein each star block copolymer ionomer comprises a core and a plurality of arms, the arms comprising a block of polyisobutylene an ionomeric block, connected to the polyisobutylene block.

It is a further aspect of the present invention to provide a star polymer comprising a core and one or more arms wherein the arms comprise a block of polyisobutylene and a block of an anionomer It is a still a further aspect of the present invention to provide a star polymer comprising a core, and one or more arms wherein the arms comprise a block of polyisobutylene and a block of a cationomer connected to the block of polyisobutylene.

It is a yet a further aspect of the present invention to provide a block copolymer anionomer comprising a block of polyisobutylene and a block of a polyacrylic acid salt, connected to the block of polyisobutylene. The polyacrylic acid salt block comprises from about 5 mol % to about 25 mol % of the block copolymer anionomer.

It is a yet a further aspect of the present invention to provide a block copolymer cationomer comprising a block of polyisobutylene and a block of a quaternized poly (2-dimethylamino ethyl methacrylate), connected to the block of polyisobutylene. The block of the poly (2-dimethylamino ethyl methacrylate), comprises from about 5 mol % to about 25 mol % of the block copolymer cationomer.

It is another aspect of the present invention to provide a process of synthesizing a block copolymer anionomer comprising the steps of providing a polyisobutylene macroinitiator having a terminus capable of mediating atom transfer radical polymerization, solubilizing, in a solvent suitable for conducting atom transfer radical polymerization, the polyisobutylene macroinitiator and a plurality of anionogenic monomers, and atom transfer radical polymerizing the polyisobutylene macroinitiator with the plurality of anionogenic monomers in the solvent to form a block copolymer anionomer precursor having at least one polyisobutylene block formed from the polyisobutylene macroinitiator, and one anionogenic block, connected to the polyisobutylene block, and, hydrolysis of the anionogenic block to form a block copolymer anionomer.

It is still another aspect of the present invention to provide a process of synthesizing a block copolymer cationomer comprising the steps of providing a polyisobutylene macroinitiator having a terminus capable of mediating atom transfer radical polymerization, solubilizing, in a solvent suitable for conducting atom transfer radical polymerization, the polyisobutylene macroinitiator and a plurality of cationogenic monomers, atom transfer radical polymerizing the polyisobutylene macroinitiator with the plurality of cationogenic monomers in the solvent to form a star block copolymer cationomer precursor having at least one polyisobutylene block formed from the polyisobutylene macroinitiator, and one cationogenic block, connected to the polyisobutylene block, and, quaternizing the cationogenic block to form a block copolymer cationomer.

It is still another aspect of the present invention to provide a process of synthesizing a star block copolymer anionomer comprising the steps of providing a polyisobutylene macroinitiator having termini capable of mediating atom transfer radical polymerization, solubilizing, in a solvent system suitable for conducting atom radical transfer polymerization, the polyisobutylene macroinitiator and a plurality of anionogenic monomers, and, atom transfer radical polymerizing the polyisobutylene macroinitiator with the plurality of anionogenic monomers in the solvent to form a star polymer having at least three arms, each arm comprising one polyisobutylene block formed from the polyisobutylene macroinitiator, and, one anionomeric block, connected to the polyisobutylene block.

It is still another aspect of the present invention to provide a process of synthesizing a star block copolymer cationomer comprising the steps of providing a polyisobutylene macroinitiator having termini capable of mediating atom transfer radical polymerization, solubilizing, in a solvent system suitable for conducting atom radical transfer polymerization, the polyisobutylene macroinitiator and a plurality of cationogenic monomers, and, atom transfer radical polymerizing the polyisobutylene macroinitiator with the plurality of cationogenic monomers in the solvent to form a star polymer having at least three arms, each the arm comprising one polyisobutylene block formed from the polyisobutylene macroinitiator and one cationomeric block, connected to the polyisobutylene block.

It is a further aspect of the present invention to provide an inverse micelle comprising a plurality of block copolymer ionomers in a hydrocarbon solvent, the block copolymer ionomers having a polyisobutylene block, and, at least one ionomeric block, wherein the plurality of copolymer ionomer chains spontaneously aggregate such that the charged ionomeric monomers and their counterions form a loosely grouped ionic aggregate, and the polyisobutylene chains extend outward into the hydrocarbon solvent.

It is a still a further aspect of the present invention to provide an endless ionomer network comprising: a plurality of tri-block copolymer ionomers in a hydrocarbon solvent, the tri-block copolymer ionomers having a polyisobutylene block, and, at least two ionomeric blocks, wherein the plurality of copolymer ionomer chains spontaneously arrange themselves such that the charged ionomeric monomers and their counterions form a plurality of loosely grouped ionic aggregates, each aggregate having one or more polyisobutylene chains extending outward into the hydrocarbon solvent, and terminating in another such ionic aggregate.

It is yet a further aspect of the present invention to provide an endless ionomer network comprising: a plurality of star polymer ionomers in a hydrocarbon solvent, the star polymer ionomers comprising a core, and, at least three block copolymer ionomer arms, each arm comprising a diblock copolymer ionomer, wherein the plurality of copolymer ionomer chains aggregate such that the charged ionomeric monomers and their counterions form-a plurality of loosely grouped ionic aggregates, each aggregate having one or more polyisobutylene chains extending outward into the hydrocarbon solvent, and terminating in another such ionic aggregate, and wherein at least some of the polyisobutylene chains terminate in an aromatic group, which resides within the length of another polyisobutylene chain spanning two ionic aggregates.

At least one or more of the foregoing aspects, together with the advantages thereof over the known art relating to block ionomers, which shall become apparent from the specification that follows, are accomplished by the invention as hereinafter described and claimed.

In general the present invention provides a block copolymer ionomer comprising one or more neutral thermoplastic polymer blocks and one or more ionomeric blocks. In particular, the present invention provides a block ionomer comprising at least one saturated rubber block and at least one ionomeric block. The ionomeric blocks may be either anionomeric or cationomeric.

It will be appreciated that the term "co-initiator" as used herein, includes Friedel-Crafts acids, including, without limitation, $BCl_3$ and $TiCl_4$, which may be used in the living carbocationic polymerization process.

It will be appreciated that the term "macroinitiator" as used herein, includes a halogenated ester of the hydrophobic polymer of interest. For example, if the hydrophobic polymer of interest is, for example, PIB, the corresponding macrointiator is $PIB-OCOC(CH_3)_2Br$, polyisobutylene-endcapped bromoisobutyrate, abbreviated PIB-iBB. Similarly, if the hydrophobic polymer of interest is, for example, tricumyl-(polyisobutylene)$_3$, abbreviated $\phi[PIB]_3$, then the corresponding macroiniator is $\phi[PIB-OCOC(CH_3)_2Br]$, abbreviated $\phi[PIB-iBB]_3$.

It will be appreciated that the term "ATRP medium," as used herein, includes any system of organic solvents, containing a transition metal halide catalyst, and electron donating ligand, suitable for conducting ATRP.

It will be appreciated that the term "ionomeric block," as used herein, means an a polymer block including either acid-derivative monomer units or amine monomer units, but not both.

It will be appreciated that the term "acid-derivative," as used herein, includes any hydrocarbon based molecule having at least one carboxylic acid residue, which does not contain nitrogen.

It will be appreciated that the term "amine" includes any hydrocarbon based molecule having at least one quaternizable amine group.

It will be appreciated that the term "block copolymer ionomer," as used herein, means a block polymer comprising a first block of a saturated rubber and at least one second block containing monomers of a readily ionizable moiety, such as an acid, an acid derivative, or an amine.

It will be appreciated that the terms "polydispersity index," "PDI," and "Mw/Mn" are used interchangeably in this disclosure and the claims that follow.

BRIEF DESCRIPTION OF THE DRAWINGS

FIG. 8 is a representative MALDI-TOF MS spectrum of (a) PIB; (b) PIB-b-PMAA; and (c) is partial enlargement of (b).

FIG. 9 is a representative kinetic study of DMAEMA conversion.

FIG. 11 is representative GPC traces of a representative macroinitiator and diblock.

FIG. 12 is a representative $^1$H NMR spectrum of PIB-b-PDMAEMA in CD$_2$Cl$_2$ solvent.

DETAILED DESCRIPTION OF THE INVENTION

Broadly, the present invention is directed toward the production or synthesis of a series of novel compositions of matter, each having a structure comprising block copolymers having at least one saturated rubber block and an at least one ionomeric block, to provide thermoplastic ionomers (elastomers) having at least two blocks. Another such composition is a star polymer, having a structure comprising a first component, referred to hereinafter as a "core," selected from the group consisting of a tri-substituted aromatic ring, for example a tricumyl group and a calixarene, connected to a plurality of second components, referred to hereinafter as "arms," comprising block copolymers wherein one segment of the copolymer comprises an isobutylene monomer and a second segment of the copolymer includes a different anionically polymerizable monomer such as, for example, tert-butyl-methacrylate (t-BMA), to provide a star polymer. It will be appreciated that since the core is a tricumyl group or a calixarene, the star polymer composition will have a plurality of polymer arms, actually more than two arms, radially extending therefrom. Hence, the term "star polymer" is used to describe these multi-arm types of compositions.

The three basic building blocks—the saturated rubber, the anionogenic monomer, and the cationogenic monomer—are exemplified by polyisobutylene (PIB), poly(methylmethacrylic acid) (PMAA), and poly (2-dimethylamino ethyl methacrylate) (PDMAEMA), respectively, which are depicted immediately below.

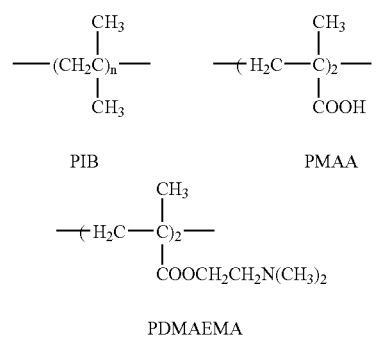

Figure 1:
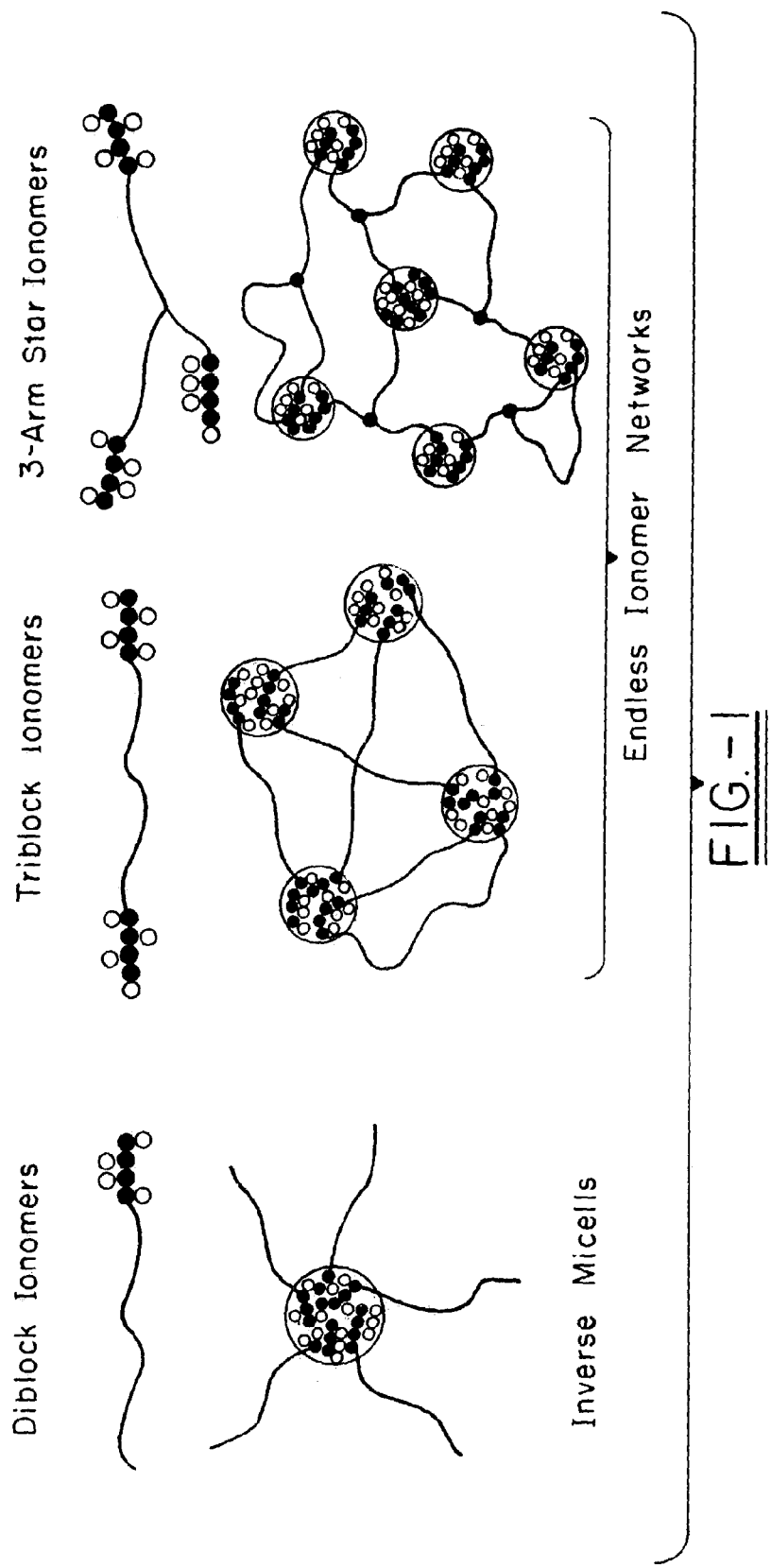
FIG. 1 depicts the aggregate structures formed by diblock, triblock and star-block copolymer ionomers of the present invention.

FIG. 1 provides an overall view of the self-assembled aggregates of the above building blocks as designed, prepared, characterized and investigated herein. The basic building block is the hydrophobic PIB moiety (indicated in FIG. 1 by solid black lines) connected to a string of cations or anions. (The symbol for ion pairs in FIG. 1 is ●○). The string of ions connected to PIB can be either cations leading to cationomers, or anions in which case anionomers will arise. The exemplary string of cations prepared in illustrating the practice of the present invention is a block of quaternized PDMAEMA units (PDMAEMA$^+$) and the exemplary string of anions is a block of ionized PMAA (PMAA$^-$). The practice of the present invention is the preparation of ionomers consisting mainly of the rubbery hydrocarbon PIB and relatively lower amounts of stiff ionic domains (multiplets). Specifically, this preparation involves the assembly of microstructures comprising a continuous PIB phase held together by relatively small amounts (about 1 to about 30 mol %) of discrete ionic domains uniformly dispersed in the hydrocarbon matrix. The diblock ionomers self-assemble to inverse micelles, the triblock ionomers to "endless ionomer networks" crosslinked by discrete ionic domains, and the three-arm star ionomers to networks held together by two fundamentally different kinds of crosslinks: one originating with the three-arm star macroinitiator and the other due to the self-assembly of ionic moieties. The discrete ionic domains holding together the micelles as well as the aggregates contain cationic or anionic polymer blocks and small counterions that provide electroneutrality.

In addition to the ionomer aggregates shown in FIG. 1, we have also prepared ionomer blends arising from combinations of anionomers with cationomers. In these blends the ionic domains consist of ion pairs of polymeric cations electrically neutralized by polymeric anions dispersed in the PIB matrix.

As we examined our synthetic options, we recognized that the "direction" of the syntheses of the exemplary block ionomers would start with the living cationic polymerization of isobutylene, followed by a living/controlled radical polymerization, a good procedure of which is atom transfer radical polymerization (ATRP), of the hydrophilic ionogenic monomers tert-butyl methacrylate (tBMA) or DMAEMA. This strategy would first yield the chemically inert PIB block which would not interfere with the planned subsequent ATRP of the polar monomers. In contrast, starting the synthesis with ATRP would first yield the polar blocks containing oxygen and/or nitrogen atoms which would complex with the Friedel-Crafts acids needed for mediating the cationic polymerization step and thus prevent the subsequent polymerization of isobutylene. This analysis leads to the conclusion that the synthesis of the envisioned ionomer blocks had to include a transformation from a site capable of mediating a cationic polymerization to a site capable of mediating atom transfer radical polymerization.

Thus, the overall synthetic strategy for the preparation of all the target ionomers, both cationomers and anionomers, consists of four major steps, exemplified by the following: 1) Preparation of desirable length saturated rubber blocks fitted with hydroxyl termini by living cationic polymerization of alkene monomers followed by end group functionalization thereof; 2) Site transformation of the hydroxyl termini to termini capable to mediate the ATRP of ionogenic monomers; 3) Effecting the ATRP of the ionogenic monomers to produce desirable length blocks attached to the saturated rubber; and 4) Completing the synthesis by producing the target ionomers, either anionomers, by hydrolyzing and neutralizing an anionogenic monomer to anionic blocks, or, cationomers, by quaternizing the cationigenic monomers to cationic blocks.

The synthesis of block ionomers has been accomplished by first synthesizing PIB through living carbocationic polymerization (LC⊕Pzn), allylation of the thus created PIB, hydroboration and oxidation of the allylated PIB to form hydroxyl terminated PIB, and adding a halogenated ester to the hydrophobic polymer, to form a macroinitiator. If an anionomer is desired, the macroinitiator is atom transfer radical polymerized with an anionogenic monomer and subsequently hydrolyzed and neutralized to form an anionomer. If a cationomer is desired, the macroinitiator is atom transfer radical polymerized with a cationogenic monomer and subsequently quatemized to form a cationomer. In the final products of the present invention, either a block copolymer anionomer or a block copolymer cationomer, the ionomeric portion comprises about 1 to about 30 mol % of the copolymer. Preferably, it comprises about 5 to about 25 mol %. Most preferably, it comprises about 15 mol %.

A first embodiment of the present invention is a process for synthesizing a block copolymer anionomer. The synthetic scheme of this embodiment is depicted immediately below:

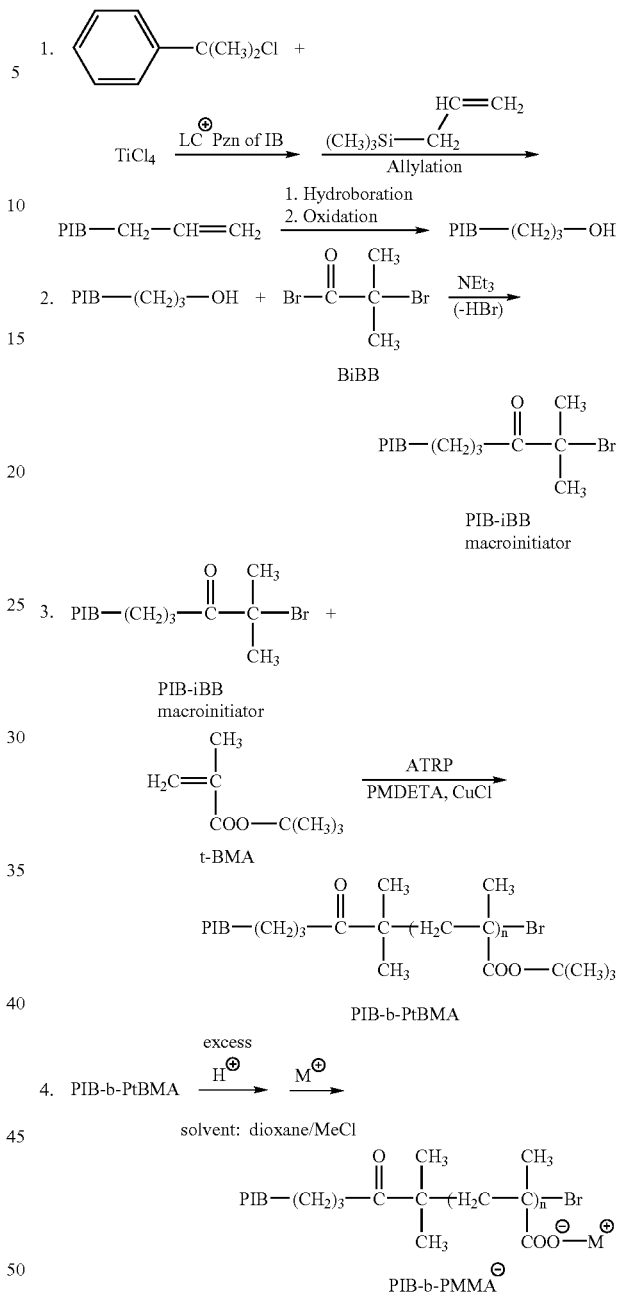

This synthetic strategy consists of four major steps, exemplified by the following: (1) The synthesis of multi-arm star telechelic (PIB) by living carbocationic polymerization (LC⊕Pzn) of isobutylene (IB) followed by termination by allylation to give an allyl-terminated PIB; (2) hydroboration/oxidation to afford —OH termini; (3) Quantitative transformation of the —OH arm termini to —OCOC(CH$_3$)$_2$Br termini to form a macroinitiator, and; (4) living controlled atom transfer radical polymerization (ATRP) of acrylonitrile mediated by the macroinitiator. It will be appreciated that the synthesis of linear diblock [AB] and triblock [ABA] copolymers is also comprehended herein. When the telechelic PIB is a monofunctional macroinitiator, then an AB block copolymer is the result. When the telechelic PB is a difunctional macroinitiator, such as a dicumyl group, then an ABA triblock copolymer is the result.

Synthesis of the block copolymers and star polymers of the present invention may be accomplished by first synthesizing PIB through living carbocationic polymerization (LC⊕Pzn). This carbocationic polymerization can be initiated by the addition of starting monomers, for example a stream of a isobutylene gas, to a Friedel Crafts acid, (e.g., $BCl_3$), an electron donor (e.g., dimethylacetamide (DMA)) and a proton trap (e.g., 2,5-di-tertbutylpyridine (DtBP)). A second Friedel Crafts acid, (e.g., $TiCl_4$,) can then be introduced and the reactor can be cooled and agitated. To quench or terminate the polymerization, a terminating agent, such as methanol, or alllyltrimethylsilane (ATMS) may be added. The carbocationic polymerization and termination is depicted above in step 1. If ATMS is used, the polyisobutylene block is allylated, that is, a —$CH_2$—CH=$CH_2$ group is added, hence terminating the polymerization of polyisobutylene, by the formation of an allyl-terminated polyisobutylene. The allyl-terminated polyisobutylene is then hydroborated and oxidated to form hydroxyl terminated PIB. The allylation, hydroboration/oxidation, and living cationic polymerization of polyisobutylene is further described in Chen, C., J. Si, and J. Kennedy, "Living Carbocationic Polymerization XLIX: Two-Stage Living Polymerization of Isobutylene to Di-tert-Chlorine Telechelic Polyisobutylene," J.M.S.-Pure Appl. Chem., A29(8), 669 (1992), the disclosure of which is incorporated herein by reference.

Suitable Friedel Crafts acids for the practice of the present invention include $BCl_3$ and $TiCl_4$. Suitable electron donors include but are not limited to: N,N-dimethylacetamide, (DMA); 1,1,4,7,10,10-hexamethyltriethylenetetramine, HMTETA; N,N,N,',N',N''-pentamethyldiethylenetriamine, (PMDETA); and dipyridyl, (dpy). Most preferred is dipyridyl. Among the preferred electron pair donors suitable for the practice of the present invention are, inter alia, dimethylacetamide (DMA), dimethyl sulfoxide (DMSO), dimethylphthalate (DMP), pyridine and its derivative triethylamine (TEA), with DMA being most preferred. Examples of proton scavengers include 2,2' bipyridyl, di-tert-butylpyridine (DtBP) and its methyl derivatives with 2,2' bipyridyl being most preferred.

Next, a halogenated ester, such as 2-bromoisobutyryl bromide (BiBB) is reacted with the hydroxyl-endcapped polyisobutylene to form a macroinitiator. The macroinitiator is capable of mediating ATRP. In particular, the macroinitiator may be synthesized beginning with a hydroxyl endcapped polyisobutylene, for example, a tricumyl (hydroxyl-endcapped polyisobutylene)$_3$ or a calix[n]arene (hydroxyl endcapped polyisobutylene)$_n$, wherein n=4 to 16. This reaction, depicted in step 2 above, is carried out in the presence of an electron donating ligand to form the macroninitiator. Next, the macroinitiator mediates ATRP of the ionogenic monomers, step 3, resulting in an ionogenic block added to each polyisobutylene block. This is known as a block copolymer anionomer precursor. The addition of an ionogenic block to a polyisobutylene block to form a narrow polydispersity polyisobutylene-block copolymer ionomer such as PIB-b-PMAA$^-$ or a star block copolymer such as φ-(PIB-b-PMAA-)$_3$ is accomplished through atom transfer radical polymerization (ATRP), which was first discussed in the patent literature in Matyjaszewski, et al, U.S. Pat. No. 5,763,548. ATRP is a living anionic radical polymerization wherein a telechelic macroinitiator, such as φ[PIB-iBB]$_3$, is placed into a solvent containing a catalyst, for example, Cu[I]Br or Cu [I]Cl, and an electron donating agent such 2,2'-bipyridyl, HMTETA, or PMDETA., or derivatives thereof. Upon adding anionically polymerizable monomers, such as DMAEMA or t-BMA, to the solution, a polymer block of the anionically polymerizable anionogenic monomers, such as PMAA, begins to grow. The anionogenic monomers include acrylic acids, which may include polyacrylic acids, or polymethacrylic acids, in particular,. Preferably, in this process, the polymethacrylic acid used is poly (tert-butyl methacrylic) acid. Thus polymerized acid derivative residues are hydrolyzed in excess acid, and neutralized, step 4, and the result is a block copolymer wherein one block is saturated rubber and at least a second block is an anionomeric block.

The final products of the present invention may include a linear diblock, or linear triblock copolymer ionomer, or a star block copolymer ionomer. For a diblock, the initiator contains a cumyl group. For a triblock, the initiator is a dicumyl group. If the star block copolymer is only a three arm star, a tricumyl core is provided where n=4 to 16. If, on the other hand, more than three arms are to be provided, a calix[n]arene core is employed. Whether a diblock, triblock or star block copolymer ionomer, the ionomeric portion of each copolymer ionomer comprises from about 1 mol % to about 30 mol %. Preferably, it comprises from about 5 mol % to about 25 mol % of the copolymer ionomer. More preferably, it comprises about 15 mol %. Living carbocationic polymerization and atom radical transfer polymerization are known for producing well defined and uniform molecular weight polymers. Hence, the copolymer ionomers of the present invention will have Mw/Mn less than about 1.50. Preferably, Mw/Mn is less than about 1.35. Most preferably, Mw/Mn is less than about 1.25.

It will be appreciated that a tricumyl group is a trifunctional initiator for the living carbocationic polymerization reaction. Hence, three arms may extend from the tricumyl group, which accordingly serves as the core of a star polymer. In a similar manner, a calixarene derivative is a multifunctional initiator for the living carbocationic polymerization reaction, and a plurality of arms equal to the number of functional sites on the calixarene may extend from the calixarene, which serves as the core of a star polymer. Thus, where calixarene derivatives are used as initiators, the number of arms, N, will depend upon the number of functional sites, n, in the calixarene product since each one arm may bond to each functional site. It is conventional in the art to refer to the number of functional sites on a calixarene by denoting the product as calix[n] arene where n equals the number of functional sites.

Synthesis of a composition of matter via the techniques described above results in a block copolymer ionomer comprising a block of polyisobutylene and at least one ionomeric block connected to the block of polyisobutylene. In particular, the ionomeric block comprises anionomers. Examples of the anionomers include an acrylic acid salt. The acrylic acid salt may include a methacrylic acid salt. Further, the methacrylic acid salt may include a poly(methacrylic acid) salt. Specifically, the poly(methacrylic acid) salt may include. The final product of this embodiment comprises polyisobutylene-block-poly(methylmethacrylic acid) salt.

The copolymers of the present invention may include, for example, a diblock copolymer, such as PIB-b-PMAA$^-$, a triblock copolymer such as PMAA$^-$-b-PIB-b-PMAA$^-$, a star polymer comprising a core component containing a tricumyl group, such as φ-(-(PIB-b-PMAA$^-$)$_3$, or a calix[n]arene where n=4 to 16, such as calix[8]arene (PIB-b-PD-MAEMA$^+$)$_8$. Generally, the star polymer has a plurality of arms connected to the core component.

The star polymers of the present invention have a core and at least one arm. The arms comprise a polyisobutylene block and an anionomeric block. The anionomeric block comprises an acrylic acid salt. The acrylic acid salt may include a methacrylic acid salt. Further, the methacrylic acid salt may include a poly(methacrylic acid) salt. Specifically, the poly(methacrylic acid) salt may include. The final product of this embodiment comprises a tricumyl [polyisobutylene-block-poly(methylmethacrylic acid) salt]$_3$ or a calix[n]arene-[polyisobutylene-block-poly(methylmethacrylic acid) salt]$_n$ wherein n=4 to 16. Clearly, then, a star polymer of this embodiment may include from 3 to 16 arms. Each arm comprises from about 75 mol % to about 95 mol % polyisobutylene and from about 25 mol % to about 5 mol % poly(methacrylic acid) salt.

With regard to the star polymers, where there are 3 arms, the core component contains a tricumyl group, and where there are more than 3 arms the core component contains a calix[n]arene; with n being to equal the number arms. Each arm comprises one polyisobutylene block directly connected to the core component, while an ionogenic block is connected to the polyisobutylene block to form a copolymer arm.

In the present invention, the tert-halo, tert-methoxy, tert-hydroxy, and tert-acetate derivatives of tricumyl groups and calix[n]arenes where n=4 to 16 are preferably used as multifunctional initiators. That is, the multifunctional initiators suitable for use according to the concepts of the present invention are preferably, but not limited to the tert-F, tert-Cl, tert-Br, tert-I, tert-OCH$_3$, tert-OH, and tert-CH$_3$COO$^-$ derivatives of a tricumyl group and the tert-F, tert-Cl, tert-Br, tert-I, tert-OCH$_3$, tert-OH, and tert-CH$_3$COO$^-$ derivatives of calix[n]arene where n=4 to 16:

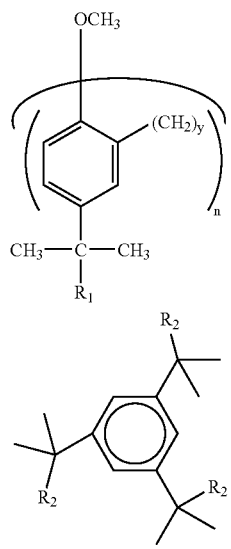

Hence, in the above calix[n]arene initiator, y=1, n=4 to 16, and R$_1$ is selected from —F, —Cl, —Br, —I, —OCH$_3$, —OH, and CH$_3$COO$^-$. Similarly, in the above tricumyl initiator, R$_2$ is selected from —F, —Cl, —Br, —I, —OCH$_3$, —OH, and CH$_3$COO$^-$. The tert-methoxy, tert-hydroxy, and tert-Cl derivatives of calix[n]arenes where n=4 to 16 are preferred. More preferred are the tert-methoxy, tert-hydroxy, and tert-Cl derivatives of calix[8]arene. Of the three specified derivatives, the tert-methoxy derivative of calix[8]arene is more preferable because it is soluble in polyisobutylene cationic polymerization charges (CH$_3$Cl/hexanes) at −80° C. In general, preferred multifunctional (octafunctional) initiators suitable for use in the present invention are octa-arm calix arene derivatives, such as octa-arm (polyisobutylene-isobutyryl bromide)$_8$, resulting in an octa arm calix[8]arene (polyisobutylene-polyacrylonitrile)$_8$ as the final star block copolymer. Specific preferred examples of multifunctional (octafunctional) initiators suitable for use in the present invention are the tert-methoxy, tert-hydroxy, and tert-Cl derivatives of 5,11,17,23,29,35,41,47-octaacetyl-49,50,51,52,53,54,55,56-octamethoxycalix[8]arene, namely 5,11,17,23,29,35,41,47-(2-hydroxypropyl)-49,50,51,52,53,54,55,56-octamethoxycalix[8]arene and 5,11,17,23,29,35,41,47-(2-methoxypropyl)-49,50,51,52,53,54,55,56-octamethoxycalix[8]arene. An even more preferred core, however, is a tricumyl group. The most preferred core is a tricumyl chloride initiator, i.e., where R$_2$ is —Cl.

The rubber used in this embodiment may be any saturated rubber that is known in the art. Examples include, but are not limited to, polyisobutylene (PIB), ethylene-propylene rubber (EPR), silicone rubber, thiokol rubbers, and tetrahydrofuran (THF) rubbers. Most preferred is polyisobutylene rubber.

The anionomer may be any carboxylic acid having from 2 to 12 carbons, which does not contain nitrogen. The carboxylic acid residue may contain straight alkyl chains and/or aromatic groups. Examples include, but are not limited to, acrylic acids and methacrylic acids, for example, (meth)acrylic acid esters such as methyl (meth)acrylic acid, ethyl (meth)acrylic acid, n-propyl (meth)acrylic acid, n-butyl (meth)acrylic acid, tert-butyl methacrylic acid (t-BMA), isopropyl (meth)acrylic acid, isobutyl (meth)acrylic acid, n-hexyl (meth)acrylic acid, 2-hydroxyethyl (meth)acrylic acid, 2-hydroxypropyl (meth)acrylic acid, 2-sulfoethyl (meth)acrylic acid, trifluoroethyl (meth)acrylic acid, glycidyl (meth)acrylic acid, benzyl (meth)acrylic acid, allyl (meth)acrylic acid, 2-n-butoxyethyl (meth)acrylic acid, 2-chloroethyl(meth)acrylic acid, sec-butyl-(meth)acrylic acid, tert-butyl (meth)acrylic acid, 2-ethylbutyl(meth) acrylic acid, cinnamyl (meth)acrylic acid, crotyl (meth) acrylic acid, cyclohexyl (meth)acrylic acid, cyclopentyl (meth)acrylic acid, 2-ethoxyethyl (meth)acrylic acid, furfuryl (meth)acrylic acid, hexafluoroisopropyl (meth)acrylic acid, methallyl (meth)acrylic acid, 3-methoxybutyl (meth) acrylic acid, 2-methoxybutyl (meth)acrylic acid, n-octyl (meth)acrylic acid, 2-ethylhexyl (meth)acrylic acid, lauryl (meth)acrylic acid, 2-phenoxyethyl (meth)acrylic acid, 2-phenylethyl (meth)acrylic acid, phenyl (meth)acrylic acid, propargyl (meth)acrylic acid, tetrahydrofurfuryl (meth) acrylic acid, norbornyl (meth)acrylic acid, tetrahydropyranyl (meth)acrylic acid, vinyl acetate, vinyl propionate, vinylidene chloride, and acrylic and methacrylic acids. It is to be understood that by "(meth)acrylic acid" is meant both the acrylic acid and the corresponding methacrylic acid as enumerated hereinabove. The most preferred acid-derivative is t-BMA.

Hence, the block copolymer ionomers produced by this embodiment of of the present invention may include a block of polyisobutylene and at least one anionomeric block. An anionomeric may be an acid derivative block, attached to the polyisobutylene block. Block copolymer anionomers and star block copolymer anionomers which may result from the practice of the present invention may include PIB-b-PMAA$^-$, PIB-b-(PMAA$^-$)$_2$, φ-(PIB-b-PMAA$^-$)$_3$, and calix[n]arene-(PIB-b-PMAA$^-$)$_n$, where n=4 to 16.

The solvent used in ATRP is very important, inasmuch as it has a profound effect on the rate of conversion and the polydispersity of the thus formed block anionomer. Typical solvents are polar organic solvents, including, but not limited to benzene, anisole, toluene, o-xylene, THF and derivatives of each and mixtures thereof. More preferred is anisole. Most preferred is a mixture of anisole and toluene.

ATRP also requires the use of a catalyst. Typically the catalyst acts as a carrier of a halogen atom in a redox process, which forms part of the ATRP. One critical feature of ATRP is maintaining a halide ion at the terminal end of the growing polymer chain. Suitable catalysts include but are not limited to halides of copper, CuX, such as CuBr and CuCl. Most preferred is CuCl.

In conjunction with the catalyst, a ligand is used, which acts as an electron donor in the redox process. Ligands suitable for use as an electron donor in ATRP include, but are not limited to: HMTETA, 1,1,4,7,10,10-hexamethyltriethylenetetramine; PMDETA, N,N,N,',N',N''-pentamethyldiethylenetriamine, and biPy, bipyridine. Most preferred is PMDETA.

The ratio of macroinitiator to ligand is also a critical parameter. Typically, the ratio of macroinitiator to ligand, for example the ratio of PIB-iBB to PMDETA may range from about 10:1 to 1:10. Preferably, this ratio is from about 5:1 to about 1:5. When producing diblock copolymer ionomers, this ratio is most preferably about 1 to 2, that is, PIB-iBB/PMDETA, w/w=1:2. However, when producing triblocks, this ratio is most preferably about 1:4.

The hydrolysis of the acid derivative group is as follows. Any inorganic mono-, di- or tri-protic acid may be used to effect the hydrolysis. Suitable acids for hydrolysis include sulfuric, hydrochloric, nitric, phosphoric. Most preferred is hydrochloric acid, HCl. The hydrolysis must be carried out with an excess of acid, with respect to the moles of the acid derivative-functionalized saturated rubber. Preferably, the acid is present in a two (2)-fold or greater molar excess. More preferably, the acid is present in a five (5)-fold or greater molar excess. Most preferably, the acid is present in a ten (10)-fold or greater molar excess.

The hydrolysis may be carried out in an organic solvent. Typical organic solvents in which to perform the hydrolysis include, benzene, toluene, xylene, anisole, hexane, cyclohexane, cyclohexanone, THF, $CH_3Cl$, $CH_3Br$, or 1,4 dioxane. Preferably, the solvent is a mixture of $CH_3Cl$ and 1,4 dioxane. More preferably, the ratio of $CH_3Cl$ to 1,4 dioxane is from about 5:1 to 1:5. Even more preferably, the ratio of $CH_3Cl$ to 1,4 dioxane is from about 3:1 to 1:3. Most preferably, the ratio of $CH_3Cl$ to 1,4 dioxane is about 2:1 (v/v).

The metal ions ($M^+$) used as counterions to the acid derivative residues include Fe[II], Ni[I], and Cu[I].

In a second embodiment, which is similar to the first, the ionogenic group added is instead cationogenic. The rubber-macroinitiator undergoes ATRP, the process of which adds monomers of an cationogenic group in the presence of a ligand and a CuX catalyst in an ATRP medium, to give a block copolymer comprising a saturated rubber block and a cationogenic block. The cationogenic block is then quaternized with a quaternizing agent, resulting in a block copolymer ionomer wherein one block is saturated rubber and at least a second is a cationomeric block. Hence, the block copolymer cationomers produced by this embodiment of of the present invention may include a block of polyisobutylene and at least one cationomeric block. A cationomeric block may be an amine block, attached to the polyisobutylene block. The amines suitable for the practice of the present invention include tertiaty amines, such as 2-(dimethylamino) ethyl methacrylate. Block copolymer cationomers and star block copolymer cationomers which may result from the practice of the present invention may include quaternized (PIB-b-PDMAEMA$^+$), quaternized PIB-(b-PDMAEMA$^+$)$_2$, quatemized φ-(PIB-b-PDMAEMA$^+$)$_3$, and quaternized calix[n]arene-(PIB-b-PDMAEMA$^+$)$_n$, where n=4 to 16. An example of the second synthetic pathway is depicted below. Hence, a star block copolymer cationomer produced by the practice of the present invention comprises a core and 3 to 16 arms. The arms comprise a block of polyisobutylene and a block of a cationomer connected to the block of polyisobutylene. The cationomers comprise amines. The amines may be quaternized with a quaternizing agent. In a preferred embodiment, the star polymers of the present invention will have arms comprising 75 mol % to about 95 mol % polyisobutylene and from about 25 mol % to about 5 mol % quaternized poly (2-dimethylamino ethyl methacrylate).

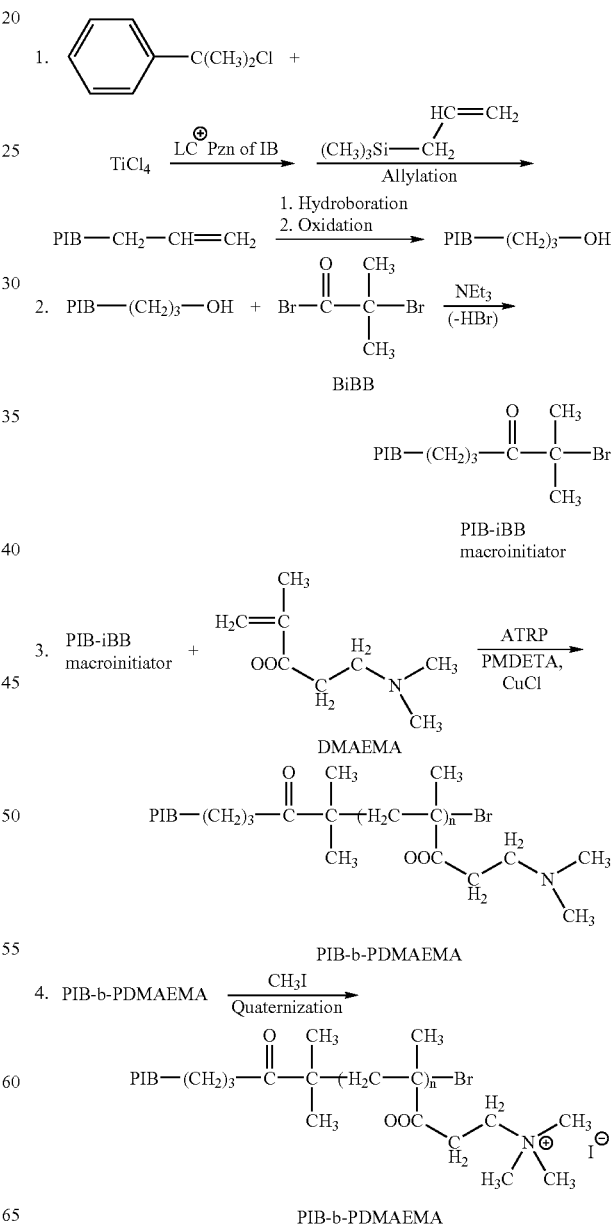

Another embodiment of the present invention is the synthesis of a block copolymer cationomer. The block copolymer cationomer comprises a block of polyisobutylene and at least one block of a cationomer. The rubber used may be any saturated rubber as known in the art. Examples include, but are not limited to, polyisobutylene (PIB), ethylene-propylene rubber (EPR), silicone rubber, thiokol rubbers, and tetrahydrofuran (THF) rubbers. Most preferred is polyisobutylene rubber.

The cationomer may be an amine, which is a quaternizable amine, and as such may include tertiary amines. Suitable tertiary amines include: t-butylaminoethyl (meth)acrylate, 2-dimethylamino ethyl methacrylate (DMAEMA). More preferred are acid derivative amines. Most preferred is DMAEMA.

Suitable as quaternizing agents are small highly polar molecules containing a halide, such as alkyl halides having from 1 to 5 carbons, aryl halides having one aromatic ring, for example methyl chloride, methyl bromide, methyl iodide, ethyl chloride, ethyl bromide, ethyl iodide, benzyl chloride, chloroacetic acid and derivatives thereof, bromoacetic acid and derivatives thereof, and iodoacetic acid and derivatives thereof. More preferred are methyl chloride, methyl bromide, methyl iodide, ethyl chloride, ethyl bromide, and ethyl iodide. Most preferred is methyl iodide ($CH_3I$).

The solvent used in the ATRP medium is very important, inasmuch as it has a profound effect on the rate of conversion and the polydispersity of the thus formed block cationomer. Typical solvents are polar organic solvents, including, but not limited to o-dichlorobenzene, anisole, toluene, o-xylene, THF, derivatives thereof and mixtures thereof. A mixture of anisole and toluene preferred. More preferred is a mixture of anisole and toluene in a ratio from about 3:1 (v/v) to 1:3 (v/v). Most preferred is a one-to-one mixture of anisole and toluene (v/v=1/1).

The ATRP process requires the use of a catalyst. Typically the catalyst acts as a carrier of a halogen atom in a redox process, which is part of the ATRP. One critical feature of ATRP is maintaining a halide ion at the terminal end of the growing polymer chain. Suitable catalysts include but are not limited to halides of copper, CuX, such as CuBr and CuCl. Most preferred is CuCl.

In conjunction with the catalyst, a ligand is used, which acts as an electron donor. Ligands suitable for use as an electron donor in ATRP include, but are not limited to: HMTETA, 1,1,4,7,10,10-hexamethyltriethylenetetramine; PMDETA, N,N,N',N',N"-pentamethyldiethylenetriamine, and biPy, bipyridine; . Most preferred is PMDETA.

The ratio of macroinitiator to ligand is also a critical parameter. Typically, the ratio of macroinitiator to ligand, for example the ratio of PIB-iBB to PMDETA may range from about 10:1 to 1:10. Preferably, this ratio is from about 5:1 to about 1:5. When producing diblock copolymer ionomers, this ratio is most preferably about 1 to 2, that is, PIB-iBB/PMDETA, w/w=1:2. However, when producing triblocks, this ratio is most preferably about 1:4.

The polydispersity index (PDI) of the block copolymer ionomers of the present invention is less than about 1.50, preferably less than about 1.35, even more preferably less than 1.25.

It will be appreciated that the block copolymer ionomers of the present invention have special behaviors inherently resulting from their unique molecular structures. Diblock, triblock, and star copolymer ionomers tend to form particular macromolecular superstructures. Diblock copolymer ionomers tend to form inverse micelles, while triblock copolymer ionomers and star-block copolymer ionomers typically form endless ionomer networks. These structures are depicted in FIG. 1.

While not being bound by any theory, it is believed that diblock ionomer copolymers, when added to a non-polar solvent, will form inverse micelles. Such structures, it is believed, result from weak ionic interactions among the ionomeric residues and their counterions. In block copolymer anionomers, the groups of interest are ionized acids anions and their metal countercations, i.e., an acid salt. In block copolymer cationomers, it is quaternized amine cations and their halide counteranions, which provide the ionic impetus.

Micelles are aggregates of molecules, typically linear molecules, which contain both polar and non-polar substituents. When placed in an aqueous medium, the hydrophilic polar groups orient themselves outward toward, and interact with, the aqueous phase and their hydrophobic nonpolar hydrocarbon chains are, by default, attracted inward to one another and hence hidden within the structure. For example, micelles which contain soap molecules remain evenly suspended in water because their surfaces are negatively charged and the micelles repel each other.

Inverse micelles result from the opposite effect, when molecules containing both polar and non-polar substituents are instead placed into a non-polar solvent such as benzene, n-hexane, n-heptane, or n-octane. An inverse micelle is an aggregate structure having hydrophilic polar groups which weakly bond to one another and orient themselves inward while their hydrophobic non-polar hydrocarbon chains orient themselves outward into the non-polar solvent matrix.

Such inverse micelles or endless ionomer networks will spontaneously aggregate when the block copolymer ionomers of the present invention are introduced into a hydrocarbon solvent matrix, or into a matrix of hydrocarbon polymers, such as PIB.

In analogous fashion, triblock copolymer ionomers will form endless ionomer networks comprising ionic domains connected by two fundamentally different kinds of crosslinks: one originating with the three-arm star macroinitiator (e.g., $\phi$-[PIB-b-iBB]$_3$) and the other due to the self-assembly of ionic moieties. The discrete ionic domains holding together the micelles as well as the aggregates contain cationic or anionic polymer blocks and small counterions that provide electroneutrality.

Inasmuch as the forces driving the formation of said inverse micelles and ionomer networks are weak ionic interactions, the strength of such interactions are dependent on temperature. Broadly speaking, as the temperature of a solution containing such di-, tri-, or star-block copolymer ionomers increases, the ionic bonds forming these macrostructures will be overcome by the kinetic energy of the ionomers in solution, thereby resulting in weakened or broken ionic bonds.

It will be appreciated that di-, tri-, or star-block copolymer ionomers may be be dissolved in a non-polar solvent such as hexane, in which a thermoplastic polymer or elastomer had previously been dissolved during polymerization of the thermoplastic polymer or elastomer. When the polymerization is complete, and the solvent is removed, the result will be a cross-linkable thermoplastic or thermoplastic elastomer wherein the crosslinking is temperature dependent. The strength of said crosslinking is approximately inversely proportional to the temperature.

Other features of this invention will become apparent in the course of the following description of exemplary embodiments, which are given for illustration of the invention and should not necessarily be construed as limiting the scope of the invention. The scope of the invention resides in the invention as hereinafter claimed, and equivalents thereof.

EXAMPLE I

Materials. tert-Butyl methacrylate (tBMA) (Aldrich, 98%) was washed three times with 1.0N NaOH, extracted three times with distilled $H_2O$, dried over anhydrous MgSO4, filtered, and vacuum distilled. Copper (I) bromide (Aldrich, 98%) and copper (I) chloride (Aldrich, 98%) were purified according to Keller et al. Tetrahydrofuran (THF) and CH2Cl2 were dried by refluxing over calcium hydride and distilled before use. Isobutylene (IB) and methyl chloride (MeCl) (Linde Division, Union Carbide Corp.) Gases were passed through a drying column packed with barium oxide and molecular sieves. n-Hexane (Aldrich) was refluxed over concentrated sulfuric acid for two days, the organic layer was washed with distilled water, dried with $MgSO_4$, stored over $CaH_2$, and distilled under dry $N_2$ before use. Triethylamine (Aldrich, 99%) and DMAEMA (98%, Aldrich) were freshly distilled before use. N,N,N',N',N"-pentamethyldiethylenetriamine (PMDETA) (Aldrich, 99%), 2-bromoisobutyryl bromide (BiBB) (Aldrich, 98%), ethyl 2-bromoisobutyrate (EBiB) (Aldrich, 98%), allyltrimethylsilane (ATMS) (Aldrich, 98%), 9-borabicyclo[3,3,1]nonane (9-BBN) (Aldrich, 0.5M solution in tetrahydrofuran), titanium (IV) chloride (Aldrich, 99.9%), boron trichloride (Union Carbide), 2,6-di-tert-butylpyridine (DtBP) (Aldrich, 97%), N,N-dimethylacetamide (DMA) (Aldrich, 99%); 1,1,4,7,10,10-hexamethyl-triethylenetetraamine (HMTETA) (97%, Aldrich) chloroform (99.9%, Fisher) and methyl iodide (99.5%, Aldrich) were used as received.

Equipment and Methods. Molecular weights and molecular weight distributions were determined by gel permeation chromatography (GPC) by a Waters GPC instrument equipped with a series of 5μ-Styragel columns (100, 500, $10^3$, $10^4$, $10^5$ Å, Waters), a Waters 410 Differential Refractometer (DRI), a Waters 2487 dual λ Absorbance Detecor (UV), and a Wyatt Technology Minidawn laser light scattering (LLS) detector. Samples were run using RHF at a flow rate of 1.0 mL/min. The calibration curve was made with narrow molecular weight distribution PIB standards. $^1$H NMR spectra were recorded on a Varian Gemini-300 MHz spectrometer. FTIR spectra were obtained with a Shimadzu FTIR-8300 spectrophotometer. Matrix-assisted laser desorption/ionization mass spectra (MALDI MS) were acquired by using a Bruker REFLEX III time-of-flight-(TOF) mass spectrometer (Bruker Daltonics, Billerica, Mass.).

Synthesis of the Initiators proceeds by a method well known in the art. Cumyl chloride, for diblocks, was prepared by bulk hydrochlorination of α-methylstyrene with dry HCl gas for 10–15 mins at 0° C. The superfluous HCl was removed by bubbling dry $N_2$ into the crude product for ~24 hrs. at 0° C. and $Al_2O_3$ was added to remove excess of moisture and HCl. The pure product was stored in a refrigerator at −20° C. The 5-tert-butyl-1,3-dicumyl chloride initiator, was prepared by hydrochlorination of 5-tert-butyl-1,3-dicumyl alcohol with HCl gas at 0° C. and $CH_2Cl_2$ [7]. The crude products were recrystallized twice from n-hexane, and the pure products were stored in a refrigerator at −20° C. For triblocks, the 1,4-dicumyl chloride, and for triblocks, the 1,3,5-tricumyl chloride initiators were prepared from the corresponding cumyl alcohols by the same method.

The Synthesis of the α-Bromoisobutyrate-Ended PIB (PIB-OCOC($CH_3$)$_2$Br) macroinitiator, (PIB-iBB), begins with the living cationic polymerization of isobutylene (IB) mediated by cumyl chloride initiator, an established process. $BCl_3$ coinitiator was used for the synthesis of low molecular weight PIBs, e.g. $M_n$=2,950 g/mol. The primary alcohol-ended PIB (PIB-OH) was obtained by dehydrochlorination followed by hydroboration/oxidation. $TiCl_4$ coinitiator was used for the synthesis of high molecular weight PIBs, $M_n$>3,000 g/mol, and allyl-ended PIBs were prepared and functionalized by hydroboration/oxidation to give the corresponding primary alcohol-ended PIB. Typical Mn and PDI of the mono-di and tri functional macroinitiator are presented in Table 1.

TABLE I

| Symbol | $M_n$ | PDI |
|---|---|---|
| Macroinitiators | | |
| Monofunctional Macroinitiator | | |
| PIB-iBB | 2950 | 1.10 |
|  | 6850 | 1.28 |
|  | 14500 | 1.14 |
| Difunctional Macroinitiator | | |
| iBB-PIB-iBB | 9100 | 1.23 |
| Trifunctional Macroinitiator | | |
| φ(PIB-iBB)$_3$ | 54000 | 1.18 |

The site transformation leading to PIB-OCOC($CH_3$)$_2$Br was performed as follows: Into a two-necked flask equipped with an addition funnel and a nitrogen inlet were placed 200 mL solution of PIB-OH in dry $CH_2Cl_2$ and 5 times molar excess of $NEt_3$, and stirred at 0° C. under $N_2$. Then, 5 times molar excess of BiBB (20% solution in dry $CH_2Cl_2$) was introduced. The charge was stirred at ambient temperature for 24 hours. The color of the solution turned yellow. After evaporating the solvent, the polymer was dissolved in hexane, the hexane solution was washed with distilled water, methanol, and distilled water, the hexane layer was separated, dried over anhydrous magnesium sulfate, filtered, and concentrated using a rotary evaporator. The PIB-iBB macroinitiator is characterized by $^1$H NMR in $CD_2Cl_2$ solvent as follows: δ=7.38 ppm (d,2H, aromatic chain end), δ=7.26 ppm (t, 2H, aromatic chain end), δ=7.12 ppm (t, 1H, aromatic chain end), δ=3.80–4.02 ppm (m, 2H, —$CH_2$—OCO—), δ=1.92 ppm (s, 6H,—OCO—($CH_3$)$_2$Br), δ=1.44 ppm (s, 2mH, —($CH_2$—C($CH_3$)$_2$)$_m$—), δ=1.11 ppm (s, 6mH,—($CH_2$—C($CH_3$)$_2$)$_m$—). FTIR using a KBr plate revealed the following peaks: 2954, 1738, 1469, 1389, 1365, 1227, 1161 cm$^{-1}$. Mn's and Mw/Mn's were determined by GPC.

Similar experiments were performed by the use of 1,4-dicumyl chloride or 5-tert-butyl-1,3-dicumyl methyl ether (tBuDiCumOMe) initiators and $TiCl_4$ to obtain ditelechelic PIB macroinitiators, e.g., [iBB-b-PIB-b-iBB]. A representative product obtained with the dicumyl chloride initiator exhibited the following characteristics: $^1$H NMR ($CD_2Cl_2$): δ=7.26 ppm (s, 4H, aromatic group), δ=4.11 ppm (t, 2H, —$CH_2$—OCO—), δ=1.92 ppm (s, 6H,—OCO—($CH_3$)$_2$Br), δ=1.44 ppm (s, 2mH, —($CH_2$—C($CH_3$)$_2$)$_m$—), δ=1.11 ppm (s, 6mH,—($CH_2$—C($CH_3$)$_2$)$_m$—). Similarly, tritelechelic PIB macroinitiator, that is φ-[PIB-b-iBB]$_3$, was obtained with the 1,3,5-tricumyl chloride/$TiCl_4$ combination. $^1$H NMR ($CD_2Cl_2$): δ=7.17 ppm (s, 4H, aromatic group), δ=4.14 ppm (t, 2H, —$CH_2$—OCO—), δ=1.92 ppm (s, 6H,—OCO—(CH$_3$)$_2$Br), δ=1.42 ppm (s, 2mH, —(CH$_2$—C(CH$_3$)$_2$)$_m$—), δ=1.09 ppm (s, 6mH,—(CH$_2$—C(CH$_3$)$_2$)$_m$—).

In advance of the synthesis of the desired di-, tri-, and star-block copolymer ionomers, a model ATRP of tBMA, has been conducted, below.

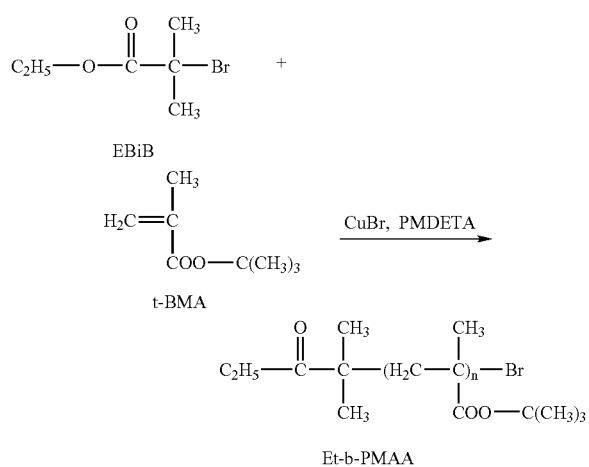

Figure 2:
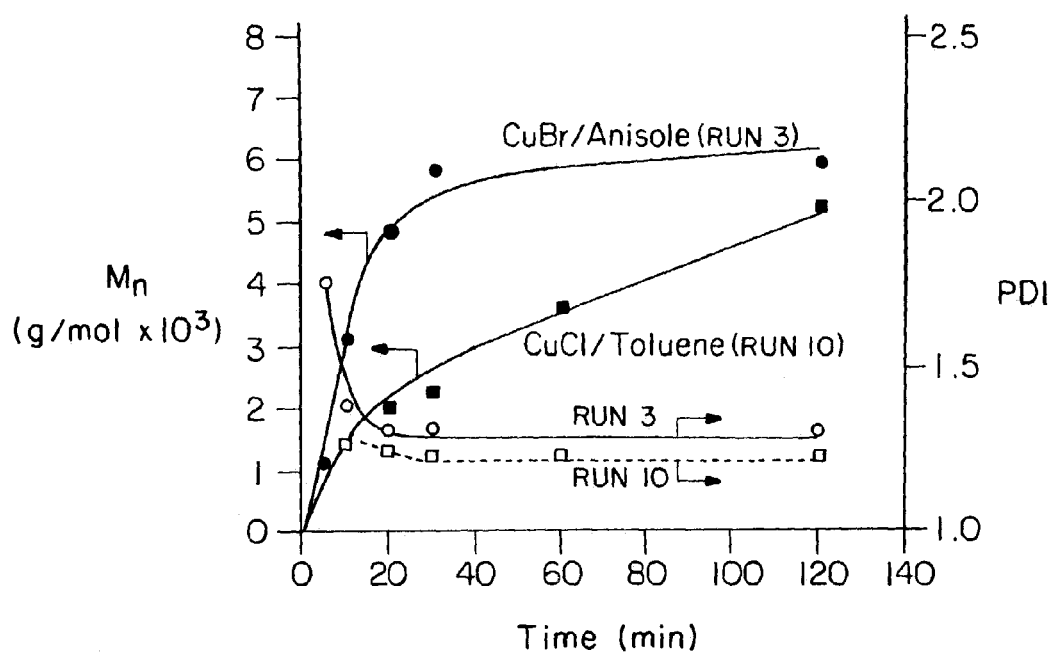
FIG. 2 is a representative kinetic study of the ATRP of t-BMA.

Table 2 compiles the results of model tBMA polymerizations by the use of EBiB initiator, CuCl or CuBr catalysts, PMDETA ligand in various solvents at 70 and 110° C. FIG. 2 shows representative Mn and PDI versus time plots obtained with CuCl (run 10) and CuBr (run 3). Reasonably well defined PtBMA with narrow PDI (<1.30) has been obtained with both catalysts and the molecular weight of PtBMA reached ~5,000 g/mol, having blocks of blocks of 5–20 repeat units, at ~40% conversions.

An increase of the temperature from 70 to 110° C. (Table 2, runs 1 and 2) decreases the molecular weights and broadens the PDI (from Mw/Mn=1.21.to 1.38), indicating loss of polymerization control. As suggested by Haddleton, this may be due to hydrolysis, which produces acid and leads to catalyst poisoning.

Increasing the monomer concentration increases the M$_n$ and conversion (runs 3, 4, 5). Bulk polymerization leads to charges too viscous to be stirred, and products with broad PDI (>2.10) and multi-modal molar weight distribution.

The polarity of the system strongly affects ATRP mediated by CuBr. The use of anisole/toluene mixtures (runs 6, 7) leads to low rates and broad PDIs. Polymerization did not occur in toluene (run no. 8).

CuCl is a more robust catalyst (runs 9, 10) than CuBr and the ATRP proceeds very well with CuCl catalyst in toluene.

Having developed convenient conditions for the controlled polymerization of t-BMA polymerization by model polymerizations, the initiation of tBMA polymerization mediated by iBB-telechelic PIB macroinitiators to obtain various well-defined block copolymers was next investigated.

The procedure followed for the model ATRP of t-BMA is as follows: In a predried Schlenk tube under a nitrogen atmosphere at room temperature were placed Cu[I]X (CuBr or CuCl) a stirring bar, the ligand (PMDETA), deoxygenated t-BMA, and solvent. The tube was tightly sealed with a rubber septum, and degassed by three freeze-pump-thaw cycles. Immediately after adding the EBiB initiator by a syringe, the charge was immersed in a thermostated oil bath maintained at a desired temperature. Sample for molecular weight analysis and conversion determination were withdrawn with a degassed syringe at various intervals during the polymerization. The samples were diluted with THF and the catalyst residues were removed by passing the samples

TABLE 2

Model ATRP of tBMA

| | Conditions[a] | | | | | | Results | | |
|---|---|---|---|---|---|---|---|---|---|
| Exp. | Solvent | Catalyst | [tBMA] mol/L | [PMDETA]/ [EBiB][b] | Time min | Temperature ° C. | Conversion[c] % | M$_n$ g/mol | PDI |
| 1 | Anisole | CuBr | 2.5 | 1 | 60 | 70 | | 4200 | 1.23 |
| | | | | | 120 | 70 | 29 | 4310 | 1.21 |
| 2 | Anisole | CuBr | 2.5 | 1 | 60 | 110 | 11 | 2180 | 1.38 |
| 3 | Anisole | CuBr | 2.5 | 2 | 5 | 70 | | 1200 | 1.74 |
| | | | | | 10 | | | 3200 | 1.37 |
| | | | | | 20 | | | 4800 | 1.28 |
| | | | | | 30 | | | 5800 | 1.29 |
| | | | | | 120 | | 40 | 5850 | 1.29 |
| 4 | Anisole | CuBr | 3.3 | 2 | 60 | 70 | 62 | 7350 | 1.31 |
| 5 | bulk | CuBr | 5.0 | 2 | 60 | 70 | 70 | 9100 | 2.10 |
| 6 | Anisole/Toluene (v/v = 1/4) | CuBr | 2.2 | 2 | 60 | 70 | 25 | 2630 | 1.35 |
| 7 | Anisole/Toluene (v/v = 1/2) | CuBr | 2.0 | 2 | 60 | 70 | 13 | 2380 | 1.33 |
| 8 | Toluene | CuBr | 2.5 | 2 | 60 | 70 | No polymerization | | |
| 9 | Anisole | CuCl | 2.5 | 2 | 60 | 70 | 82 | 6670 | 1.25 |
| 10 | Toluene | CuCl | 2.5 | 2 | 10 | 70 | | 1380 | 1.27 |
| | | | | | 20 | | | 2010 | 1.24 |
| | | | | | 30 | | | 2240 | 1.23 |
| | | | | | 60 | | | 3590 | 1.23 |
| | | | | | 120 | | 60 | 5180 | 1.22 |

[a]The polymerizations were carried out in 2 mL of solvent, with (tBMA]/[EBiB]/[CuBr] = 100/1/1 in moles.
[b]Molar stoichoimetry.
[c]Determined by gravimetry.

through a column of neutral alumina. The product was precipitated into MeOH/H$_2$O (v/v=1/1), filtered and vacuum dried at 45° C. The products were white solids. A representative product (M$_n$=5,850 g/mol, PDI=1.29, conversion 40%, sample no.3, Table 2 exhibited the following characteristics. FTIR: 2976, 1723, 1476, 1392, 1366, 1248, 847 cm$^{-1}$. $^1$H NMR in CDCl$_3$ solvent revealed the following: δ=1.85–2.75 ppm (m, 2H, main chain-CH$_2$—), δ=1.44 ppm (s, 9H, —(CH$_3$)$_3$), δ=0.98–1.10 ppm (d, 3H,—CH$_3$). Mm's and Mw/Mn's were determined by GPC.

The hydrolysis of PtBMA to PMAA was performed by a 10-molar excess of HCl in 1,4-dioxane at 80° C. for 3 hours. The solvent was removed by a rotary evaporator. FTIR spectroscopy revealed peaks at 2300–3700, 1704, 1267, 1173, 800 cm$^{-1}$.

Guided by the information generated by model ATRP of tBMA mediated by EBiB, we proceeded to investigate the intermediate was used as macroinitiator to initiate the ATRP of tBMA mediated by the CuCl/PMDETA system. A linear molecular weight-time relationship was observed for both steps. The molecular weights were obtained by integrating $^1$H NMR spectra. The time scale is different for the two polymerization steps, because the polymerization conditions and rates are different. A linear molecular weight-time relationship held for the whole course of the living IB polymerization step, while the molecular weight-time relationship was linear only over the lower conversion range (<45%) for the ATRP of tBMA.

Table 3 shows the results of representative blocking experiments. ATRP of t-BMA was successful by the use of CuBr catalyst and PMDETA ligand in anisole at 70° C. (runs 1, 2). The CuCl catalyst is more robust than CuBr and yields reasonable conversions even in toluene.

TABLE 3

ATRP of tBMA mediated by PIB macroinitiators

| | | | Conditions[a] | | | Results | | | |
|---|---|---|---|---|---|---|---|---|---|
| Expt. | Catalyst | Initiator[b] | Solvent (mL) | tBMA mol/L | Time min | Conv.[c] % | M$_{n,theor.}$ g/mol | M$_{n,exptl.}$ g/mol | PDI |
| Diblock copolymers | | | | | | | | | |
| 1 | CuBr | PIB-iBB | Anisole (2) | 1.6 | 60 | 41 | 6,000 | 4060 | 1.35 |
| 2 | CuBr | PIB-iBB | Anisole (2) | 4.8 | 60 | 55 | 12,000 | 5540 | 1.25 |
| 3 | CuCl | PIB-iBB | Anisole (2) | 1.6 | 10 | | 6,000 | 3160[d] | 1.34 |
| | | | | | 20 | | 6,000 | 3550[d] | 1.33 |
| | | | | | 30 | | 6,000 | 4158[d] | 1.34 |
| | | | | | 45 | 73 | 6,000 | 4580[d] | 1.30 |
| Triblock copolymers | | | | | | | | | |
| 4 | CuBr | iBB-PIB-iBB | Anisole (2) | 0.5 | 60 | No polymerization | | | |
| 5 | CuBr | iBB-PIB-iBB | Anisole/Toluene[e] (2) | 0.5 | 60 | No polymerization | | | |
| 6 | CuCl | iBB-PIB-iBB | Toluene (2) | 0.5 | 60 | 57 | 14,600 | 11400 | 1.28 |
| 7 | CuCl | iBB-PIB-iBB | Toluene (2) | 1.5 | 60 | 39 | 17,000 | 13740 | 1.31 |
| Three-arm stars | | | | | | | | | |
| 8 | CuCl | φ(PIB-iBB)$_3$ | Toluene (8) | 0.2 | 60 | 82 | 57,000 | 55,900[d] | 1.23 |
| 9 | CuCl | φ(PIB-iBB)$_3$ | Toluene (8) | 0.4 | 60 | 76 | 60,000 | 58,500[d] | 1.20 |
| 10 | CuCl | φ(PIB-iBB)$_3$ | Toluene (8) | 0.8 | 60 | 62 | 66,000 | 61,100[d] | 1.24 |

Figure 3:
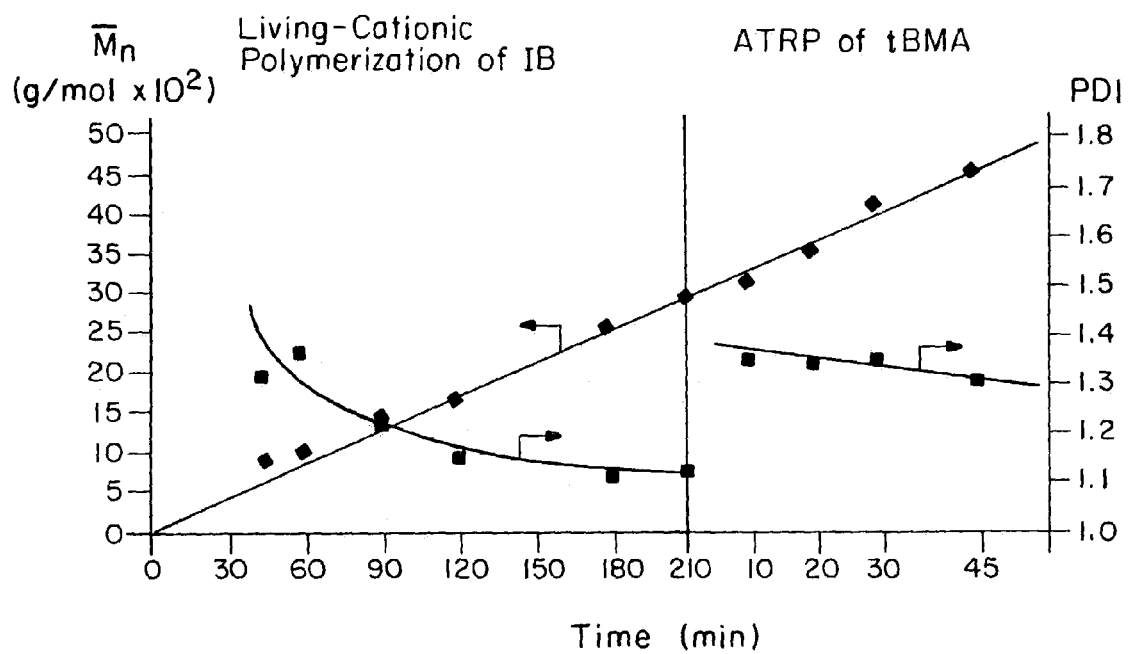
FIG. 3 is a representative kinetic study of the living polymerization of IB and the ATRP of t-BMA.
Figure 4:
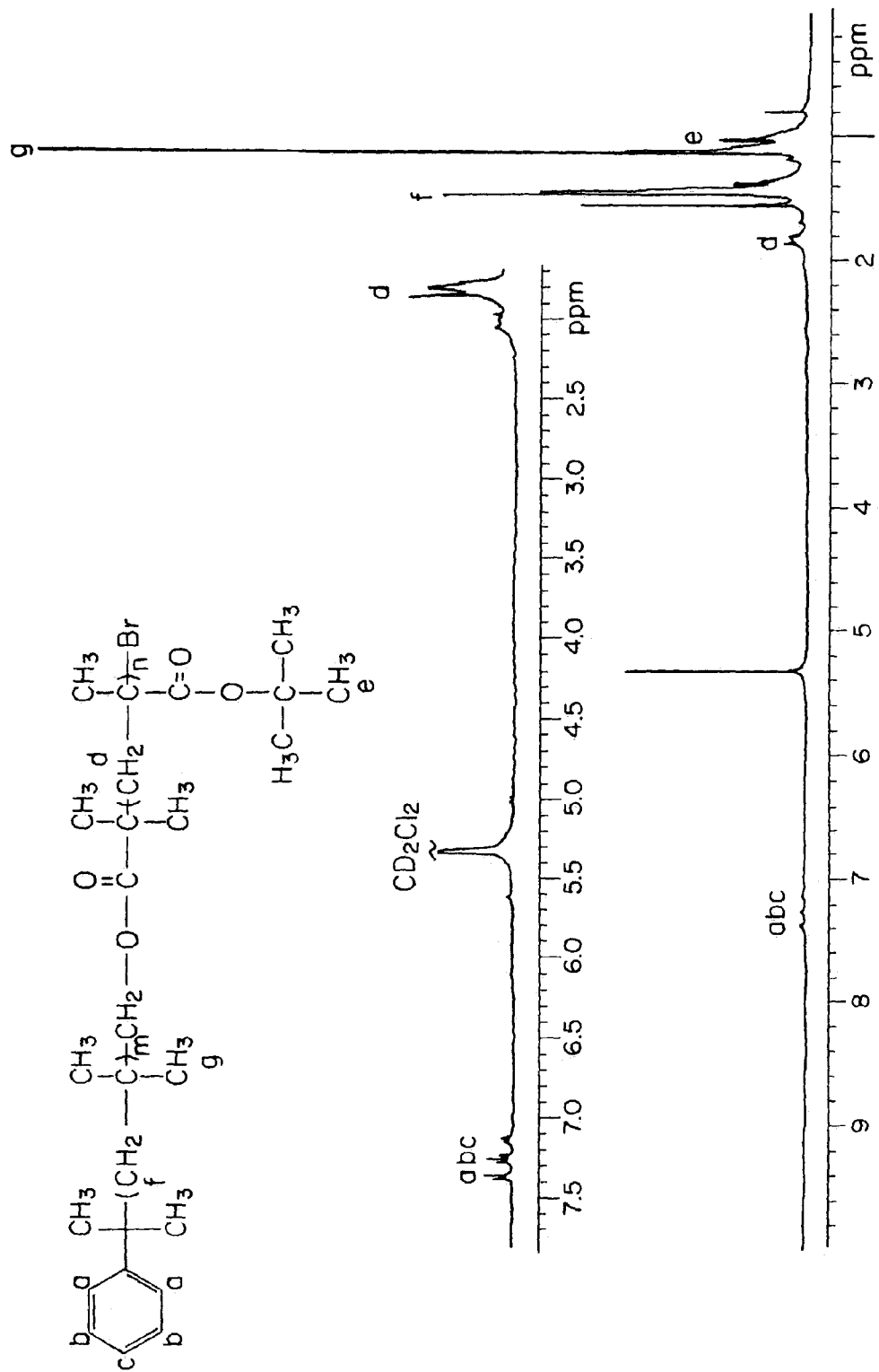
FIG. 4 is a representative $^1$H NMR spectrum of P-t-BMA in CDCl$_3$ solvent.

[a]Polymerizations were carried out in 2 mL of solvent at 70° C.; [PIB-iBB]/[CuCl]/[PMDETA] = 1/1/2 moles.
[b]PIB-iBB; M$_n$ = 2,950 g/mol, PDI = 1.10; iBB-PIB-iBB: M$_n$ = 9,000 g/mol, PDI = 1.23; φ(PIB-iBB)$_3$: M$_n$ = 54,000 g/mol, PDI = 1.18.
[c]by gravimetry.
[d]By $^1$H NMR.
[e]v/v = 1/1.

synthesis of PIB-b-PtBMA. FIG. 3 summarizes the results of a two-phase experiment showing the combined molecular weight/time profile of both the cationic IB polymerization phase, and the subsequent ATRP of tBMA phase. The first living cationic polymerization phase was conducted by the use of the CumCl/BCl$_3$ initiating system with CH$_3$Cl in the presence of DtBP at −80° C., and was quenched by ATMS. The allyl-PIB was isolated, characterized, and converted to PIB-OH, which in turn was converted to PIB-iBB. This Various aspects of blocking tBMA from PIB-iBB have been investigated by spectroscopic techniques. Thus, FIG. 4 shows the $^1$H NMR spectrum, together with assignments, of a PIB-b-PtBMA obtained in a blocking experiment by the use of CuBr/PMDETA and anisole at 70° C. (see Expt. 1 in Table 3). The molecular weight of the tBMA segment can be calculated by integrating the amount of aromatic protons (a+b+c, 5H) in respect to the methylene protons of the main chain (d, 2n H). This calculation yields n=7.5, a value which correlates well with that determined by GPC ($M_n$=4,060 g/mol).

Figure 5:
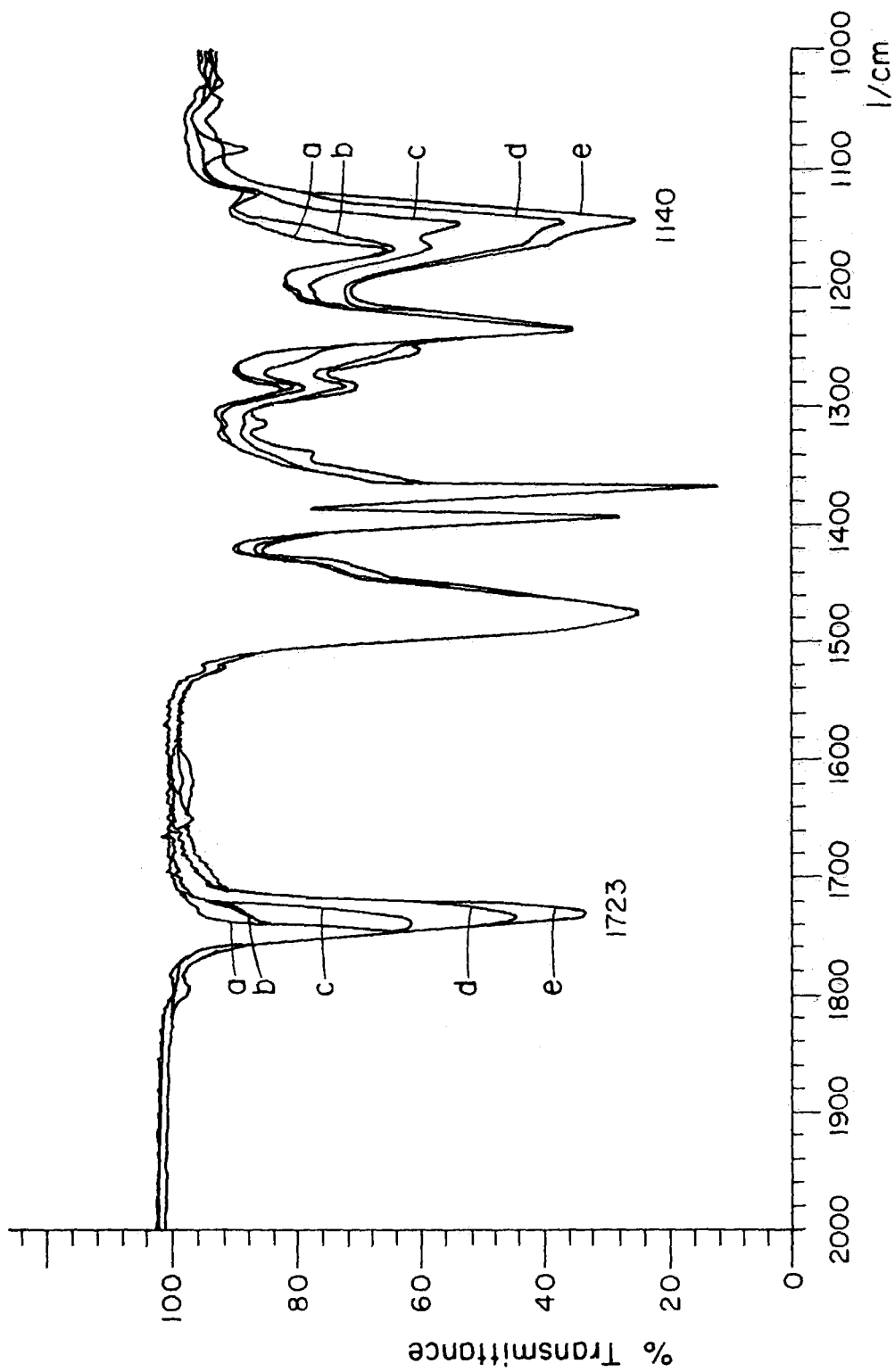
FIG. 5 is a representative FTIR spectrum during PIB-iBB mediated ATRP of tBMA showing the progress of the polymerization reaction.

FIG. 5 shows the changes observed in the FTIR spectra obtained during a block copolymerization with CuCl catalyst in toluene at 70° C. The carbonyl stretch of the —OCO—(CH$_3$)$_2$Br macroinitiator (trace a) at 1723 cm$^{-1}$ associated with the carbonyl stretch of the tBMA segment. The absorption at 1140 cm$^{-1}$ (C—O stretch) also indicates the incorporation of the tBMA segment. The intensity of both absorptions increases with increasing conversions.

Due to the low solubility of PIB in anisole in a concentrated ATRP charge, we have tried to increase the amount of anisole and to use anisole/toluene mixed solvents with CuBr catalyst (expts. 4, 5, Table 3). However, these trials remained unsuccessful, most likely because of the high dilution and reduced polarity of the system. Gratifyingly, ATRP proceeded satisfactorily with CuCl in toluene (expts. 6, 7, 8, 9, 10, Table 3).

The procedure followed for the synthesis of PIB-b-PtBMA, PtBMA-b-PIB-b-PtBMA, and φ-[PIB-b-PtBMA]$_3$ is as follows: In a dried Schlenk tube under a nitrogen atmosphere at room temperature were placed CuCl (29.8 mg, 0.3 mmol), a stirring bar, PMDETA (0.125 mL, 0.6 mmol), deoxygenated tBMA (1.02 mL, 6.3 mmol), and 0.5 mL toluene. The system was tightly sealed with a rubber septum, and degassed by three freeze-pump-thaw cycles. The PIB-OCOC(CH$_3$)$_2$Br macroinitiator ($M_n$=2,950 g/mol, 0.9 g, 0.3 mmol) was dissolved in 1.5 mL toluene, the solution degassed by three freeze-pump-thaw cycles, and injected by a syringe to the charge. The temperature of the system was raised to 70° C. for a desired time. The product was precipitated with MeOH, and the solvent was decanted. To remove completely the blue color, the crude product was dissolved in a minimum amount of THF, MeOH/H$_2$O (v/v=10/1) was added to the RHF solution, and the supernatant was decanted. This procedure was repeated three more times until the product became completely colorless. Finally, the product was vacuum dried, and the conversion was 55% of theoretical, yielding 0.91 g. FTIR: 2974, 2898, 1724, 1474, 1390, 1366, 1247, 1139, 848 cm$^{-1}$.

Figure 6A:
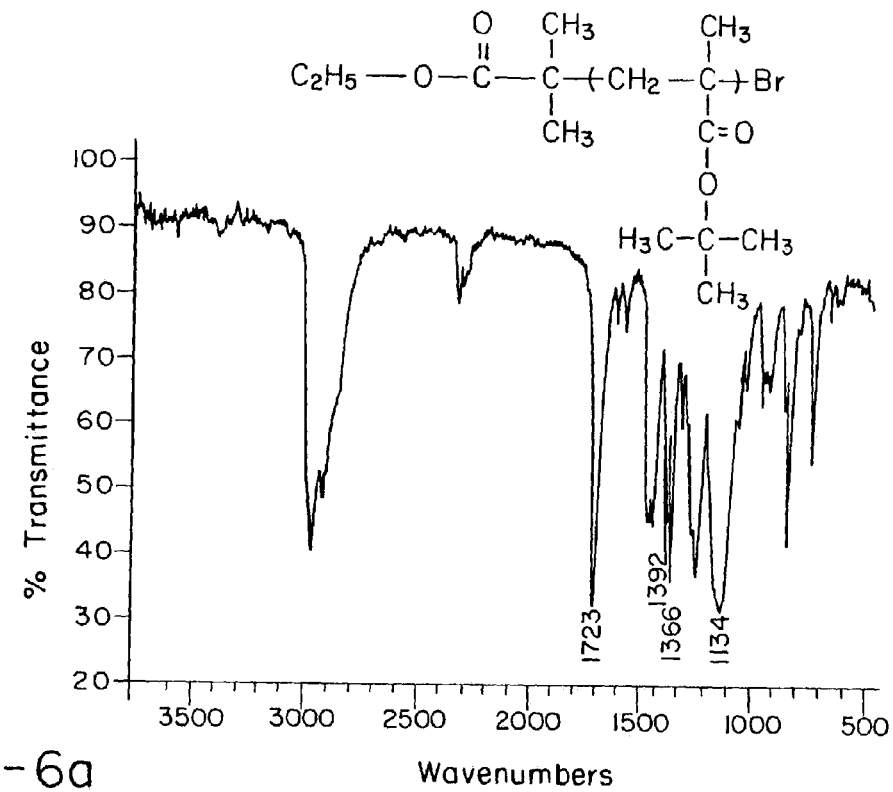
FIG. 6 is a representative FTIR spectrum of tBMA before (a) and after (b) hydrolysis.
Figure 6B:
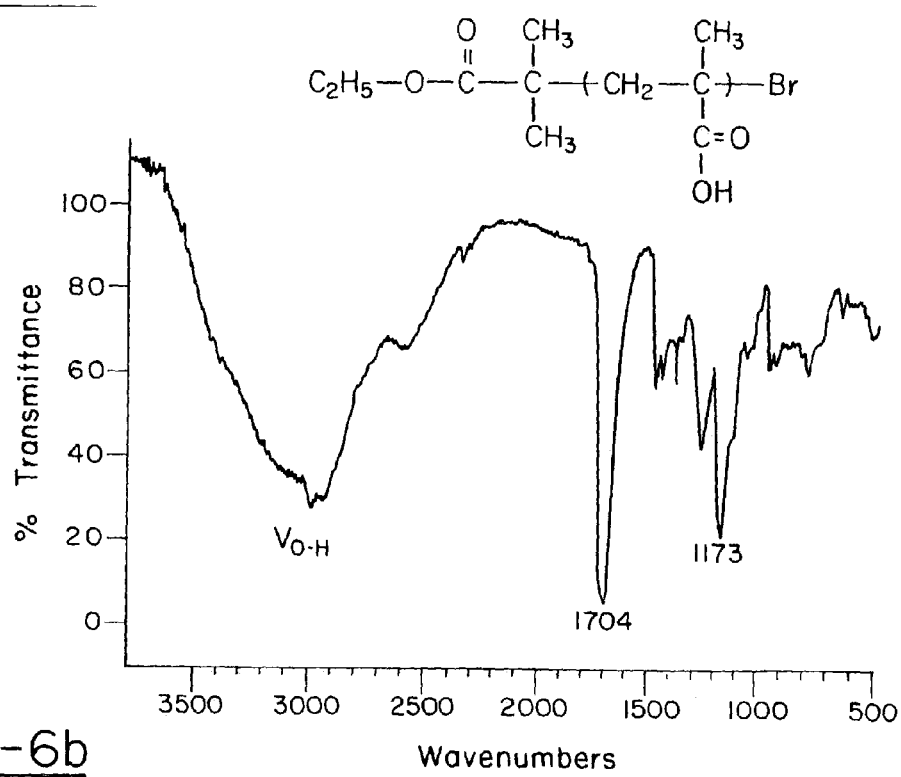

Synthesis of PIB-b-PMAA, PMAA-b-PIB-b-PMAA, and φ-[PIB-b-PMAA]$_3$. The final synthesis step, i.e., the transformation of tert-butyl ester groups of PtBMA to the corresponding acid groups, was carried out by HCl-catalyzed hydrolysis in 1,4-dioxane for 5 hours at 100° C. FIG. 6 shows the FTIR spectra of PtBMA ($M_n$=5,800 g/mol, PDI=1.29, run no. 3, Table III) before hydrolysis (6a) and the product obtained after hydrolysis (6b). The appearance of the broad absorption in the 2500–3700 cm$^{-1}$ range indicates the presence of OH groups (stretch $v_{OH}$). The shift of the carbonyl peak ($v_{C=O}$) and the almost total disappearance of the tert-butyl group (characteristic split peaks at 1392 and 1366 cm$^{-1}$) indicates essentially quantitative hydrolysis to PMAA.

Figure 7A:
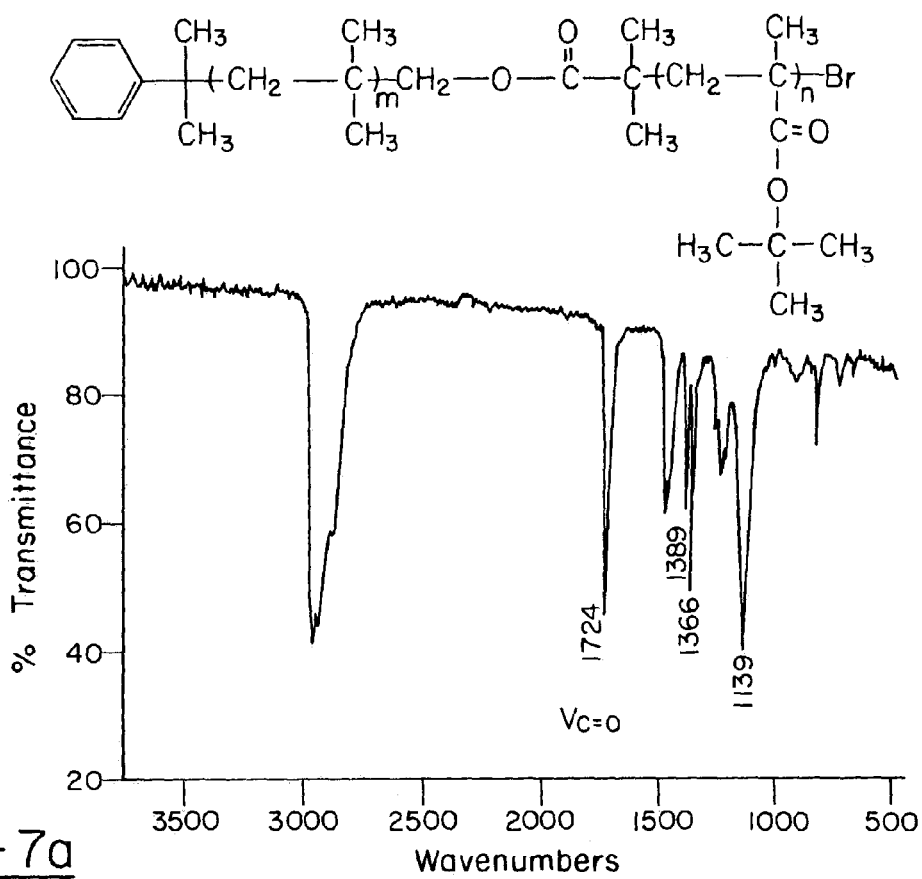
FIG. 7 is a representative FTIR spectrum of (a) PIB-b-PtBMA and (b) PIB-b-PMAA.
Figure 7B:
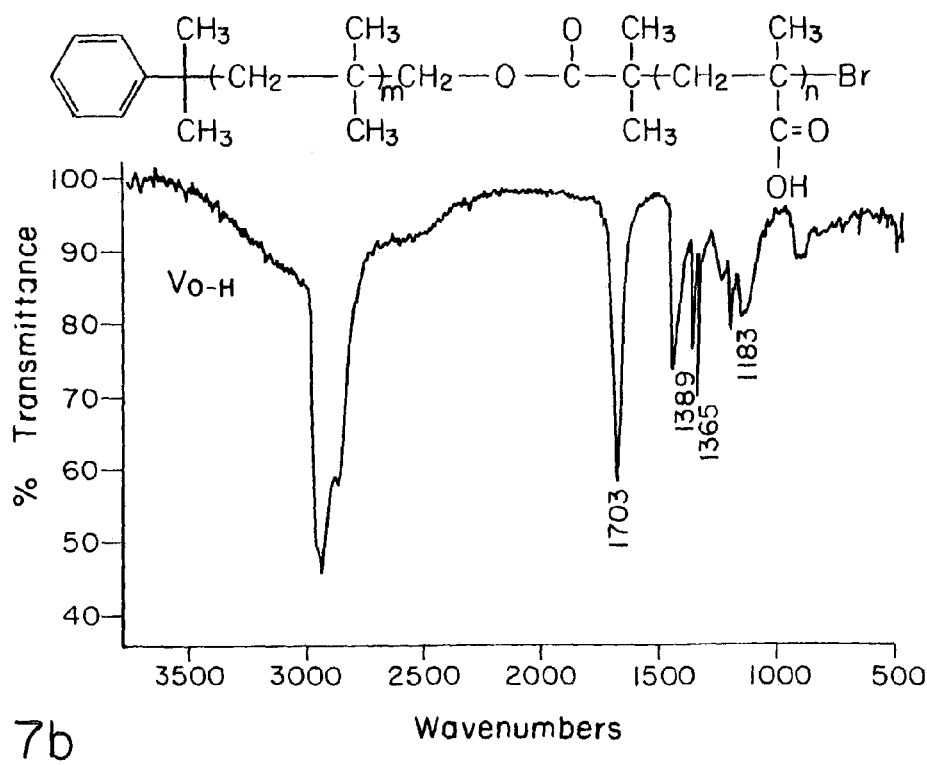

The same procedure was employed for the hydrolysis of the block copolymers. To avoid the hydrolysis of ester groups in the main chain, a lower temperature (~80° C.) and a shorter reaction time (3 hours) was used. Since high molecular weight PIB-b-PMAA, PMAA-b-PIB-b-PMAA, and φ-[PIB-b-PMAA]$_3$, particularly when the PIB content is high, are insoluble in 1,4-dioxane, we have tried to use THF, cyclohexanone, and CH$_3$Cl/1,4-dioxane (v/v=2/1 and 1/1) mixtures for the hydrolysis. Hydrolysis in THF at 60° C. was unsuccessful, and the extent of hydrolysis in cyclohexanone and CH$_3$Cl/1,4-dioxane mixed solvents was ~60%. Complete hydrolysis was obtained by the use of CH$_3$Cl/1,4-dioxane (v/v=2/1) at 80° C. Representative FTIR spectra are shown in FIG. 7. The appearance of the broad O—H stretch ($v_{OH}$) at 2300–3500 cm$^{-1}$, and the shift of the carbonyl stretch ($v_{C=O}$) from 1724 to 1703 cm$^{-1}$ indicate high conversion of the hydrolysis. The ratios of absorption intensities at 1724 and 1703 cm$^{-1}$ can be used to determine the extent of hydrolysis.

FIG. 8 shows the MALDI-TOF MS spectrum of the PIB macroinitiator, that of PIB-b-PMAA, and a partial enlargement of the latter. Both spectra show monodisperse molecular weight distributions. The calculated molecular weight of the PIB macroinitiator is 2,300 g/mol and PDI=1.15, values that correlate well with those obtained by GPC ($M_n$=2,950 g/mol and $^1$H NMR ($M_n$=2,700 g/mol). The number of methacrylic acid (MAA) units, n, of PIB-b-(MAA)$_n$, is 7–8 calculated by $^1$H NMR spectroscopy, and this value is in satisfactory agreement with that obtained by MS, n=6.

Hydrolyses of PIB-b-PtBMA, PtBMA-b-PIB-b-PtBMA, and φ-[PIB-b-PtBMA]$_3$ leading to PIB-b-PMAA, PMAA-b-PIB-b-PMAA, and φ-[PIB-b-PMAA]$_3$ were performed by the use of 10 molar excess of HCl relative to tBMA repeat units in 1,4-dioxane/CH$_3$Cl (v/v=2/1) at 80° C. for 3 hours. Except for the experiments performed with very low tBMA concentration, e.g., PtBMA(1K)-b-PIB(9K)-b-PtBMA(1K) where the product remained in solution, the hydrolyzed products were precipitated by pouring the solutions in MeOH, filtered, washed with chloroform, and vacuum dried. Depending on the molecular weights and compositions, colorless viscous or powdery products were obtained. FTIR: 2400–3600, 2952, 2893, 1703, 1474, 1389, 1365, 1229, 1183, 853 cm$^{-1}$.

Table 4 summarizes the anionomers prepared. The table shows the number average molecular weight and degree of polymerization of the blocks. For example, PIB(80)-b-PMAA$^-$(7) indicates a diblock ionomer consisting of a PIB block of 80 repeat units connected to a PMAA$^-$ block of 7 units.

TABLE 4

Summary of Block Anionomers Prepared.

| Product | $M_{n,total}$[a] g/mol | PMAA$^-$ Block Content wt %/mol % | PDI |
|---|---|---|---|
| Diblock Anionomers | | | |
| PIB(54)-b-PMAA (7) | 3,550 | 16.7/11.5 | 1.31 |
| PIB(54)-b-PMAA (7) | 4,380 | 31.5/22.9 | 1.25 |
| Triblock anionomers | | | |
| φ[PIB(80)-b-PMAA$^-$ (7)]$_2$ | 55,030 | 1.9/1.2 | 1.24 |
| φ[PIB(80)-b-PMAA$^-$ (16)]$_2$ | 56,580 | 4.6/3.0 | 1.20 |
| Three-arm star anionomers | | | |
| φ[PIB(320)-b-PMAA$^-$ (4)]$_3$ | 55,030 | 1.9/1.2 | 1.24 |
| φ[PIB(320)-b-PMAA$^-$ (10)]$_3$ | 56,580 | 4.6/3.0 | 1.20 |
| φ[PIB(320)-b-PMAA$^-$ (18)]$_3$ | 58,640 | 7.9/5.3 | 1.24 |

[a]Determined by $^1$H NMR.

EXAMPLE 2

The materials, equipment and methods for the preparation of the PIB and macroinitiator (PIB-iBB) are identical to those in Example 1.

Preparatory to the synthesis of the target di- and triblocks, model ATRPs of DMAEMA have been conducted. We have examined in some detail the polymerization of DMAEMA mediated by the EBiB/CuBr/PMDETA system:

Model ATRP of DMAEMA

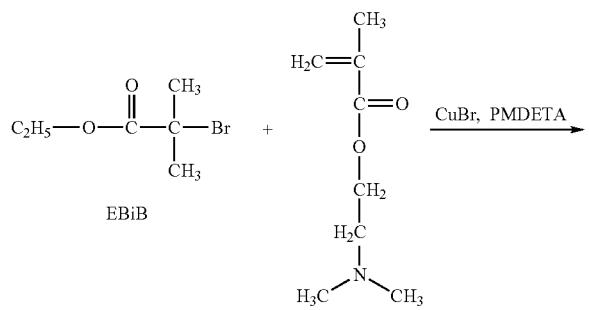

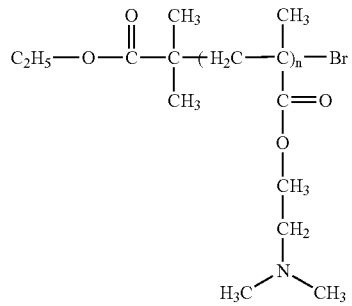

Et-b-PDMAEMA

Table 5 shows the effect of experimental conditions on our (model) homopolymerization of DMAEMA. The solvent plays an important role in the ATRP of PDMAEMA. Polar solvents, such as dichlorobenzene and anisole, provide good media and lead to satisfactory product. Increasing the temperature or the amount of the ligand gave increased conversions. By the use of 3 mol/L monomer and anisole as solvent, we have obtained over 60% conversion in 20 mins with PDI~1.3. The use of benzene, toluene and THF gave slow and poorly controlled polymerizations, and broad PDIs. Increasing the amount of the PMDETA ligand led to somewhat lower PDI (1.60), however, the conversion remained very low (3.5%).

TABLE 5

Model ATRP of DMAEMA.

| | | Conditions[a] | | | | Results | | |
|---|---|---|---|---|---|---|---|---|
| Expt. | Solvent | [DMAEMA] mol/L | [PMDETA]/[EBiB] | Time h | Temperature °C. | Conversion[b] % | $M_n$,[c] g/mol | PDI |
| 1 | o-di-chlorobenzene | 3.0 | 1 | 5 | 70 | 50 | 6560 | 1.58 |
| 2 | | 3.0 | 2 | 0.33 | 70 | 52 | 12080 | 1.47 |
| | | | | 0.67 | | 77 | 14900 | 1.48 |
| | | | | 1 | | 84 | 16890 | 1.51 |
| | | | | 2 | | 89 | 16780 | 1.54 |
| | | | | 5 | | 94 | 16720 | 1.51 |
| 3 | | 3.0 | 2 | 0.33 | 40 | 18 | 1510 | 1.85 |
| | | | | 0.67 | | 36 | 4510 | 1.81 |
| | | | | 1 | | 45 | 5370 | 1.52 |
| | | | | 1.5 | | 50 | 7770 | 1.51 |
| | | | | 2 | | 50 | 8380 | 1.51 |
| | | | | 5 | | 48 | 8180 | 1.51 |
| 4 | Anisole | 3.0 | 1 | 0.33 | 70 | 66 | 13340 | 1.49 |
| | | | | 0.67 | | 87 | 16580 | 1.45 |
| | | | | 1 | | 80 | 16380 | 1.44 |
| | | | | 4 | | 86 | 16450 | 1.35 |
| | | | | 5 | | 85 | 17710 | 1.30 |
| 5 | | 3.0 | 2 | 5 | 70 | 87 | 13650 | 1.28 |
| 6[d] | | 3.0 | 1 | 5 | 70 | 61 | 10130 | 1.32 |
| 7 | | 2.0 | 1 | 2 | 70 | 17 | 2390 | 1.77 |
| 8 | Benzene | 3.0 | 1 | 20 | 50 | 4 | 5350 | 1.85 |
| 9 | | 3.0 | 2 | 20 | 50 | 4 | 200 | 2.67 |
| 10 | Toluene | 3.0 | 1 | 5 | 70 | 4 | 1050 | 1.57 |
| 11 | | 3.0 | 2 | 20 | 70 | 20 | 2200 | 1.48 |
| 12 | THF | 3.0 | 1 | 20 | 50 | 2 | 4930 | 2.03 |
| 13 | | 3.0 | 2 | 20 | 50 | 4 | 5850 | 1.60 |
| 14 | Anisole/THF(v/v = 1/1) | 1.7 | 1 | 5 | 70 | Bimodal MWD | | |
| 15 | Anisole/Toluene(v/v = 1/1) | 1.7 | 1 | 5 | 70 | 76 | 11920 | 1.35 |

[a][DMAEMA]/[EBiB]/[CuBr] = 128/1/1 in moles.
[b]by gravimetry.
[c]Theoretical $M_n$ (at 100% conversion) = 19,900 g/mol.
[d]HMTETA as ligand.

Reagent concentrations, time, and temperature strongly affect polymerization outcome. FIG. 9 shows monomer conversion as a function of time at 40° C. and 70° C. in o-dichlorobenzene and anisole solvents. Initially (i.e., during the first ~90 mins at 40° C., and for ~20 mins at 70° C.) the molecular weights increase linearly, however, they soon reach a plateau which indicates loss of polymerization control. The rates increase with increasing temperature, but the overall phenomenon remains the same: The initially controlled/living polymerization rapidly becomes inactive. Since the desirable PDMAEMA block length of our target block ionomers was much less than ~25 units (i.e., $M_{n,PDMAEMA}$<4,000 g/mol), the molecular weights obtained during the controlled/living phase of these model polymerizations were sufficient for our purpose. Thus, we have made no further efforts to increase the molecular weight of our polymers.

Figure 10A:
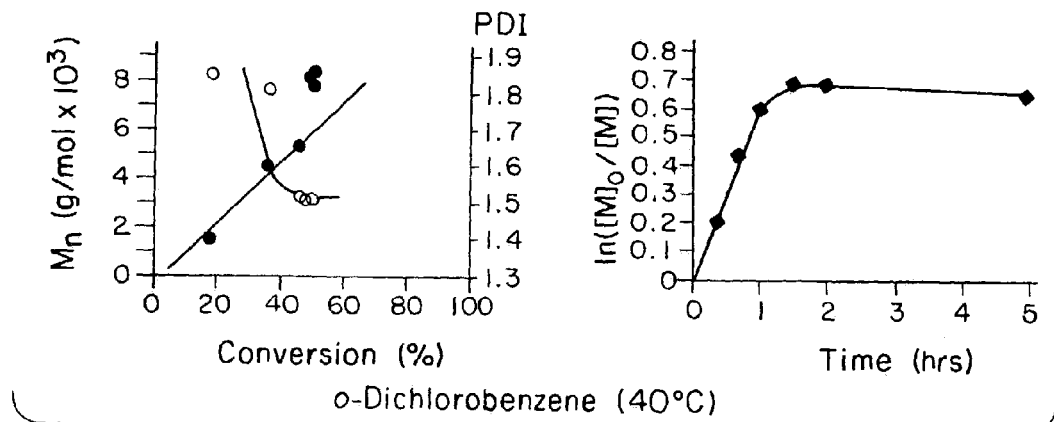
FIG. 10 is a representative kinetic Study of the ATRP of DMAEMA in various solvents.
Figure 10B:
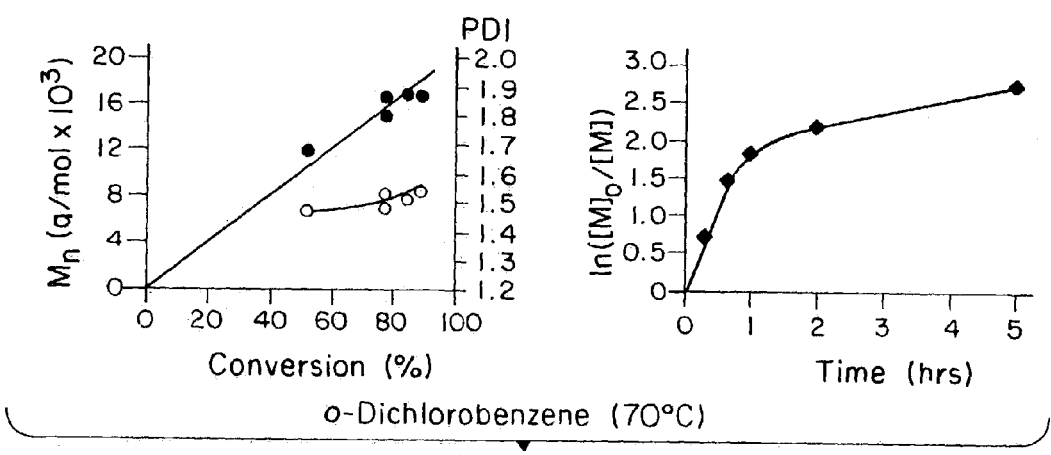
Figure 10C:
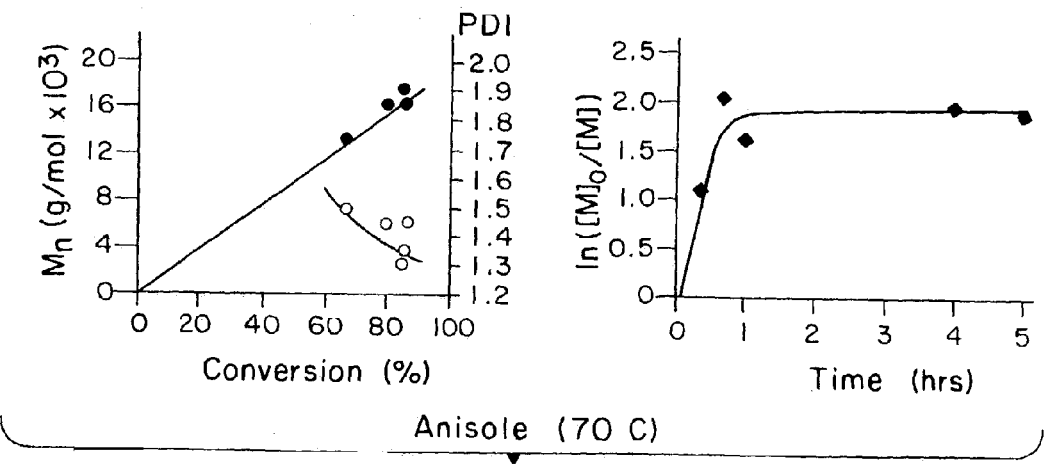

FIG. 10 shows the results of a brief kinetic study of ATRP of DMAEMA using o-dichlorobenzene and anisole solvents. According to these experiments, the molecular weights increased linearly with conversions (i.e., chain transfer to monomer was essentially absent) to levels much in excess to that (~4,000 g/mol) needed for the synthesis of the target block ionomers. The corresponding $\ln([M]_0/[M])$ versus time plots were linear during the initial phase of the polymerizations indicating the absence of termination during this period. The combination of these evidences suggest satisfactory controlled/living polymerization of DMAEMA up to ~4,000 g/mol, which is more than sufficient for our purpose.

Poor conversion, low molecular weight, and broad molecular weight distribution was obtained in a polymerization carried out by the use of a relatively low monomer concentration (2 mol/L, see Expt. 7, Table 5). Evidently, relatively high monomer concentrations are mandatory for satisfactory control of DMAEMA polymerizations (see also later). Unsatisfactory results were obtained by the use of benzene, toluene, and THF (i.e., low conversion and high PDI, see Expts. 8–13).

Orienting experiments were also carried out by the use of mixed solvent systems (Expts. 14, 15). These experiments were designed to provide guidance for the synthesis of block copolymers in which, necessarily, both the nonpolar PIB and polar PDMAEMA moieties had to be in solution. These studies showed that anisole/THF gave an unacceptable product having a bimodal molecular weight distribution. However, anisole/toluene (v/v=1/1) gave encouraging results (Mw/Mn=1.35 at about 80% conversion) suggesting that toluene acted only as a diluent and did not interfere with the ATRP of DMAEMA in anisole.

The procedure followed for the model ATRP of DMAEMA is as follows: In a predried Schlenk tube under a nitrogen atmosphere at room temperature were placed a stirring bar, different quantities of catalyst (CuBr), ligand, N,N,N',N',N"-pentamethyldiethylenetriamine, (PMDETA) or 1,1,4,7,10,10-hexamethyltriethylenetetramine (HMTETA), deoxygenated DMAEMA, and solvent. The tube was tightly sealed with a rubber septum, and degassed by three freeze-pump-thaw cycles. The ethyl 1,2-bromoisobutyrate (EBiB) initiator was added by a syringe, and the charge was immersed in a thermostated oil bath maintained at a desired temperature. Samples for molecular weight analysis and conversion determination were withdrawn with a dried syringe at various intervals during the polymerization. Aliquot charges were deactivated by quenching into Dry Ice and the product was precipitated with methanol. The product was dissolved in THF, and the catalyst was removed by passing samples through a column of neutral alumina. Subsequently, most of the solvent was evaporated, and the product was precipitated by the addition of hexanes, filtered, and vacuum dried. $^1$H NMR (D$_2$O): δ=4.19 ppm (s, 2H, —CO—O—CH$_2$—CH$_2$—N—), δ=2.75 ppm (s, 2H, —CO—O—CH$_2$—CH$_2$—N—), δ=2.34 ppm (s, 6H, —N—CH$_3$)$_2$), δ=1.70–2.30 ppm (2H, —CH$_2$—C—), δ=0.80–1.25 ppm (d, 3H, —C—CH$_3$).

Having assembled a variety of well-defined mono and difunctional macroinitiators (see Table 1) and having acquired guidance from model ATRP of DMAEMA experiments (see Table 5), we have turned our attention to develop conditions for the synthesis of di- and triblock copolymers of PIB and PDMAEMA. Orienting experiments showed that relatively low molecular weight PIB ($M_n$=2,950 g/mol) readily dissolved in anisole. Higher molecular weight PIB ($M_n$=9,100 g/mol) gave swollen gels that dissolved only when toluene was added (i.e., 1 g PIB in 2 mL anisole=gel; addition of 2 mL toluene=solution) or in higher amounts of anisole (e.g., 1 g PIB in 4 mL of anisole), however, polymerization failed to occur in the latter system. Table 6 summarizes the results of blocking experiments. Conversions were calculated from block copolymer molecular weights, determined by $^1$H NMR spectroscopies. In view of the relatively low molecular weight PDMAEMA segments in respect to the PIB block, gravimetric conversion analysis would have caused large errors. In line with the results of model studies, the first synthesis would have caused large errors. In line with the results of model studies, the first synthesis of PIB-b-PDMAEMA was carried out by the use of [DMAEMA]=6.9M, [PIB-iBB]=[CuBr]=0.3M, [PMDETA]=0.6M, and anisole at 70° C. The rate was high, and the molecular weight of the PIB-b-PDMAEMA increased quickly. Monomer conversion reached 51% after only 10 mins, and reached a plateau in 40 mins at ~75% with $M_n$ of ~6,000 g/mol. As in DMAEMA model polymerizations, the PDI was initially relatively high, and decreased to ~1.20 in 1 h.

TABLE 6

ATRP of DMAEMA mediated by PIB macroinitiators.

| Expt. | Macroinitiator[b] | Conditions[a] DMAEMA mmol | Anisole mL | Toluene mL | Time (min) | Conv.[c] % | $M_{n,NMR}$ g/mol | $M_{n,GPC}$[d] g/mol | PDI | PDMAEMA wt % | Content mol % |
|---|---|---|---|---|---|---|---|---|---|---|---|
| Diblocks | | | | | | | | | | | |
| 1 | PIB-iBB | 6.9 | 2 | 0 | 10 | 51 | 4,990 | 5,080 | 1.31 | 41 | 19 |
| | | | | | 20 | 58 | 5,300 | 5,270 | 1.26 | 44 | 22 |
| | | | | | 30 | 66 | 5,620 | 5,430 | 1.25 | 48 | 24 |

TABLE 6-continued

ATRP of DMAEMA mediated by PIB macroinitiators.

| Expt. | Macroinitiator[b] | Conditions[a] DMAEMA mmol | Anisole mL | Toluene mL | Time (min) | Conv.[c] % | $M_{n,NMR}$ g/mol | $M_{n,GPC}$[d] g/mol | PDI | PDMAEMA wt % | Content mol % |
|---|---|---|---|---|---|---|---|---|---|---|---|
| | | | | | 40 | 74 | 5,930 | 5,310 | 1.21 | 50 | 26 |
| | | | | | 60 | 74 | 5,930 | 5,390 | 1.21 | 50 | 26 |
| | | | | | 300 | 84 | 6,350 | 6,100 | 1.20 | 54 | 29 |
| 2 | PIB-iBB | 2.3 | 2 | 0 | 60 | 88 | 4,100 | 4.050 | 1.24 | 28 | 12 |
| 3 | PIB-iBB | 34.5 | 2 | 0 | 60 | 12 | 4,680 | 4,700 | 1.67 | 37 | 17 |
| 4 | PIB-iBB | 34.5 | 4 | 0 | 60 | | No Polymerization | | | | |
| 5 | PIB-iBB | 34.5 | 2 | 2 | 60 | 41 | 9,070 | 13,200 | 1.32 | 67 | 42 |
| Triblocks | | | | | | | | | | | |
| 6 | iBB-PIB-iBB | 1.27 | 4 | 0 | 60 | | No. Polymerization | | | | |
| 7 | iBB-PIB-iBB | 1.27 | 2 | 2 | 60 | 74 | 10,500 | 9,800 | 1.42 | 13 | 5 |
| 8 | iBB-PIB-iBB | 5.08 | 2 | 2 | 60 | 75 | 15,000 | 11.260 | 1.20 | 39 | 19 |

[a]Reaction conditions: PIB-iBB/CuBr/PMDETA = 0.3 mmol/0.3 mmol/0.6 mmol, iBB-PIB-iBB/CuBr/PMDETA = 0.1 mmol/0.2 mmol/0.4 mmol,. 70° C. [b]$M_{n,PIB-iBB}$ = 2,950 g/mol; $M_{n,iBB-PIB-iBB}$ = 9,100 g/mol.
[c]Calculated from 1H NMR data.
[d]Approximate values obtained by using PIB calibration.

FIG. 11 shows the GPC traces of the PIB-iBB macroinitiator and the PIB-b-PDMAEMA obtained after 5 hours of polymerization. Both traces are symmetrical. Relative to the trace of the macroinitiator, that of the copolymer moved toward higher moledular weights, suggesting the formation of a well-defined block copolymer. In spite of the predominant presence of PDMAEMA, the product was found to be insoluble either in MeOH/$H_2O$ (v/v=1/1), solvent for PDMAEMA and nonsolvent for PIB, or in hexanes, solvents for PIB and nonsolvents for PDMAEMA. Precipitation of the product with MeOH/$H_2O$ (v/v=1/1) and hexanes, respectively, indicating negligible amounts of PDMAEMA and PIB contaminants in the product; the finding indicates efficient initiation by the PIB-iBB macroinitiator and the absence of chain transfer.

Recently, Zeng et al. reported that the efficiency of ATRP of DMAEMA depended on the nature of initiator and the type of ligand, and that the structure of macroinitiator strongly affects DMAEMA block copolymerization by ATRP. These authors obtained clean block copolymers with PMMA- or PMA-based macroinitiators, however, chain extension from Pst-based macroinitiator was less efficient. Out results indicate that the PIB-iBB macroinitiator is efficient for atom transfer radical block copolymerization of DMAEMA mediated by CuBr-PMDETA.

The composition and microstructure of PIB-b-PDMAEMA were characterized by $^1$H NMR and FTIR spectroscopies. FIG. 12 shows the $^1$H NMR spectrum together with assignments of a representative diblock. The resonances correlate well with the expected structure. The molecular weight calculated for the PDMAEMA segment by integration of resonances d+e+f (10n H) and a+b+c (5H) is $M_{n,PDMAEMA}$=3,400 g/mol.

Figure 13A:
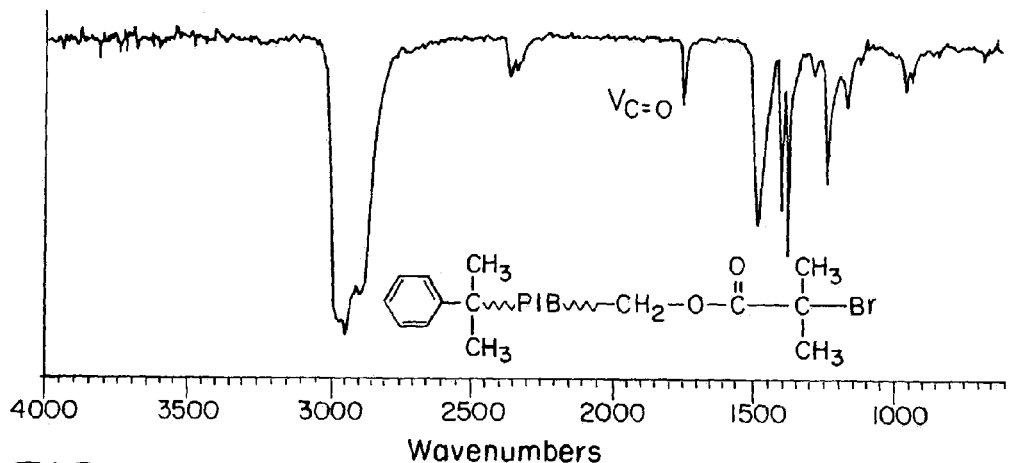
FIG. 13 is a representative FTIR spectrum of (a) PIB macroinitiator, (b) DMAEMA, and (c) PIB-b-PDMAEMA.
Figure 13B:
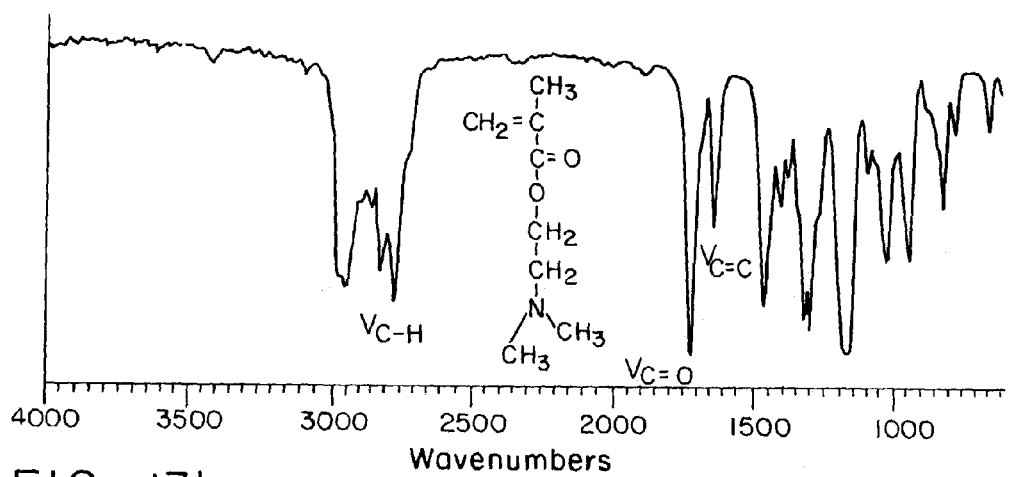
Figure 13C:
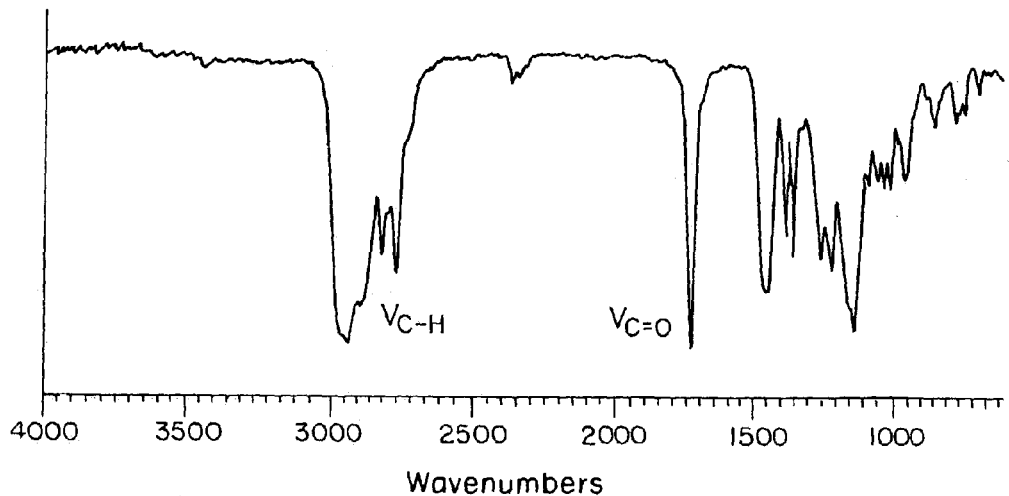

FIG. 13 compares the FTIR spectra of a PIB-iBB microinitiator (13a), DMAEMA (13b), and PIB-b-PDMAEMA (13c). The appearance of a strong peak at 1728 cm$^{-1}$ associated with C=O, and those at 2770 and 2820 cm$^{-1}$ indicating CH vibrations, is evidence for the incorporation of a PDMAEMA segment in the block copolymer.

The synthesis of PIB-b-PDMAEMA containing relatively low molecular weight PIB segments (i.e., $M_{n,PIB}$=2,950 g/mol) proceeds satisfactorily under the conditions outlined in Table 6 and by the use of anisole as solvent. In contrast, block copolymers containing higher molecular weight PIBs (i.e., $M_{n,PIB}$=9,100 g/mol) cannot be prepared under these concentration conditions with anisole because these PIB macroinitiators are insoluble (only swell) in this solvent (see above). Doubling the amount of anisole resulted in inactive systems (see Expts. 4 and 5).

Gratifyingly, in line with model experiments, we found that anisole/toluene (v/v=1/1) mixture gave the predicted molecular weights with both di- and triblocks even with the higher molecular weight PIB segments (Expts. 5, 7, 8, Table 6). The molecular weight (length) of PDMAEMA attached to the di-telechelic PIB chain ends can be calculated by integrating the resonance of the aromatic residue (s, 4H) relative to the DMAEMA blocks, i.e., —N(CH$_3$)$_2$ (δ=2.2–2.4, 6H), —CO—O—CH$_2$—CH$_2$—N— (δ=2.6–2.8, 2H), or —CO—O—CH$_2$—CH$_2$—N— (δ=4.0–4.3, 2H).

The synthesis of PIB-b-PDMAEMA was as follows: In a dried Schlenk tube under a nitrogen atmosphere at room temperature were placed a stirring bar, CuBr (43.2 mg, 0.3 mmol), PMDETA (0.125 mL, 0.6mmol), deoxygenated DMAEMA (1.16 mL, 6.9 mmol,) and 0.5 mL anisole/toluene (v/v=1/1). The system was tightly sealed with a rubber septum and degassed by three freeze-pump-thaw cycles. The PIB-iBB ($M_n$=2,950 g/mol; 0.9 g, 0.3 mmol) was dissolved in 1.5 mL anisole/toluene (v/v=1/1), and the solution was degassed by three freeze-pump-thaw cycles and injected by a syringe to the charge. The temperature of the system was raised 70° C. for desired times. Depending on the molecular weight and the composition of the block copolymer, the product was precipitated and washed. In the case of the lower molecular weight macroinitiator ($M_n$=2, 950 g/mol), the block copolymer product was vacuum dried, dissolved in a minimum amount of THF, precipitated and washed with MeOH/$H_2O$ (v/v=1/1), and vacuum dried at 40° C. In the case of the higher molecular weight macroinitiator ($M_n$=9,100 g/mol), the product was precipitated and washed with MeOH,and vacuum dried. Crude products were dissolved with THF, passed through a column of neutral alumina to remove traces of catalyst, and the solvent was removed by a rotary evaporator. Characterization of PIB-b-PDMAEMA with $^1$H NMR in a CD$_2$Cl$_2$ solvent is showin in FIG. 12, as follows: δ=7.38 ppm (d, 2H, aromatic chain end), δ=7.27 ppm (t, 2H, aromatic chain end), δ=7.15 ppm (t, 1H, aromatic chain end), δ=4.02 ppm (s, 2H,—CO—O—CH$_2$—CH$_2$—N—), δ=2.54 ppm (s, 2H,—CO—O—CH$_2$—CH$_2$—N—), δ=2.23 ppm (s, 6H,—N—(CH$_3$)$_2$), δ=1.70–2.00 ppm (2H,—CH$_2$—C—), δ=1.42 ppm (s, 2mH,—(CH$_2$—C—CH$_3$)$_2$)$_m$—), δ=1.12 ppm (s, 6mH,—(CH$_2$—C—CH$_3$)$_2$)$_m$—), δ=0.85–1.25 ppm (d, 3H,—C—CH$_3$). FTIR: 2950, 2894, 2819, 2769, 1729, 1468, 1389, 1365, 1269, 1231, 1149, 955 cm$^{-1}$.

Tertiary amines can be readily transformed to the corresponding iodide salts by the Menshutkin reaction:

Menshutkin Reaction-Quaternization

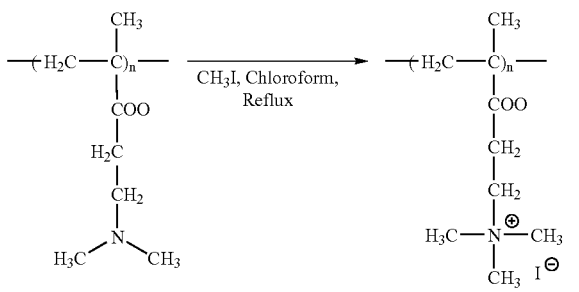

Figure 14A:
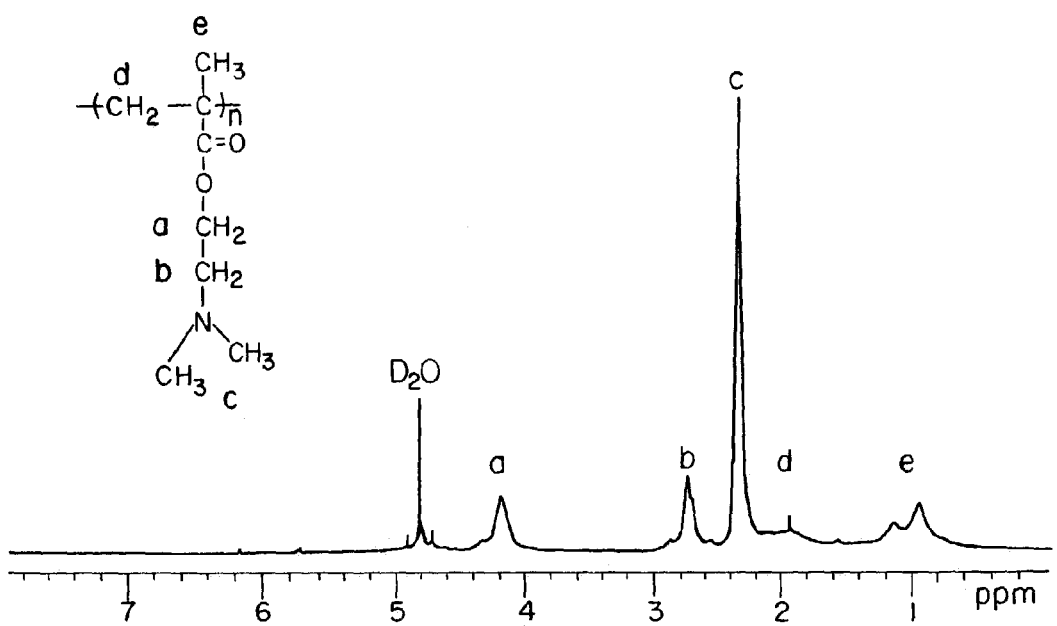
FIG. 14 is a representative $^1$H NMR spectrum of PDMAEMA (a) before and (b) after quaternization.
Figure 14B:
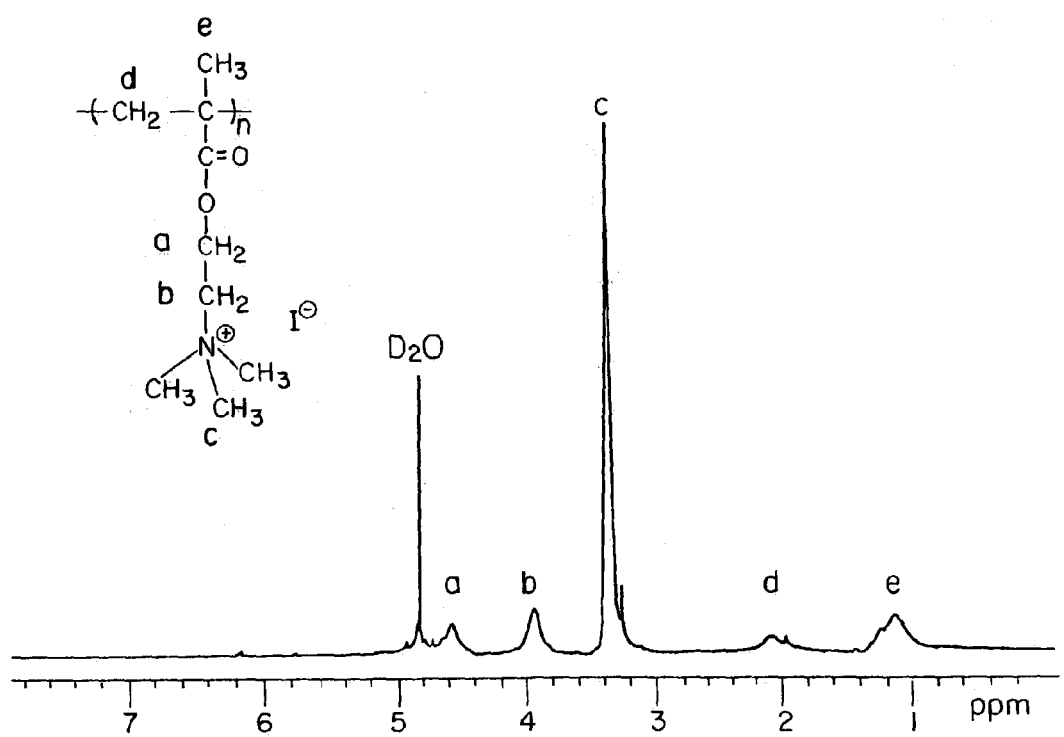

A model quaternization experiment was carried out by using PDMAEMA (M$_n$=11,400 g/mol, PCI=1.39) obtained by ATRP and CH$_3$I. The quaternization proceded smoothly under the conditions studied, and a light yellow powder P(DMAEMA$^+$I$^-$) precipitated out of the CHCl$_3$ solution in 30 mins. The product was readily soluble in water, but not in THF, chloroform, or MeOH. In contrast, PDMAEMA readily dissolves in RHF, chloroform, MeOH, and water. FIG. 14 shows $^1$H NMR spectra of PDMAEMA before and after quaternization in D$_2$O. The complete shift of the —N—(CH$_3$)$_2$(c) resonance from 2.2–2.4 (6H) to 3.2–3.4 (9H), —CO—O—CH$_2$—CH$_2$—N— (b,2H) from 2.6–2.8 to 3.8–4.0, and —CO—O—CH$_2$—CH$_2$—N— (a, 2H) from 4.0–4.3 to 4.4–4.7 ppm indicates essentially quantitative quaternization. The resonances of the main chain methylene protons (d, 2H) and side methyl group protons (e, 3H) also shift to lower fields, however, the extent of this shift is moderate because these protons are far away from the reaction center.

Figure 15A:
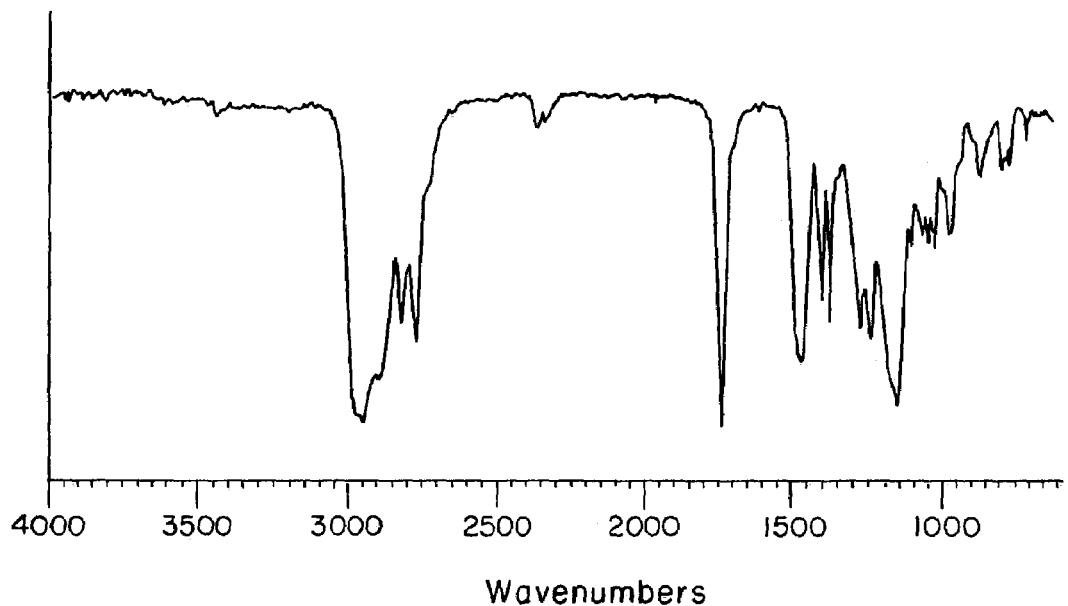
FIG. 15 is a representative FTIR spectrum of PDMAEMA-b-PIB-b-PDMAEMA (a) before and (b) after quaternization.
Figure 15B:
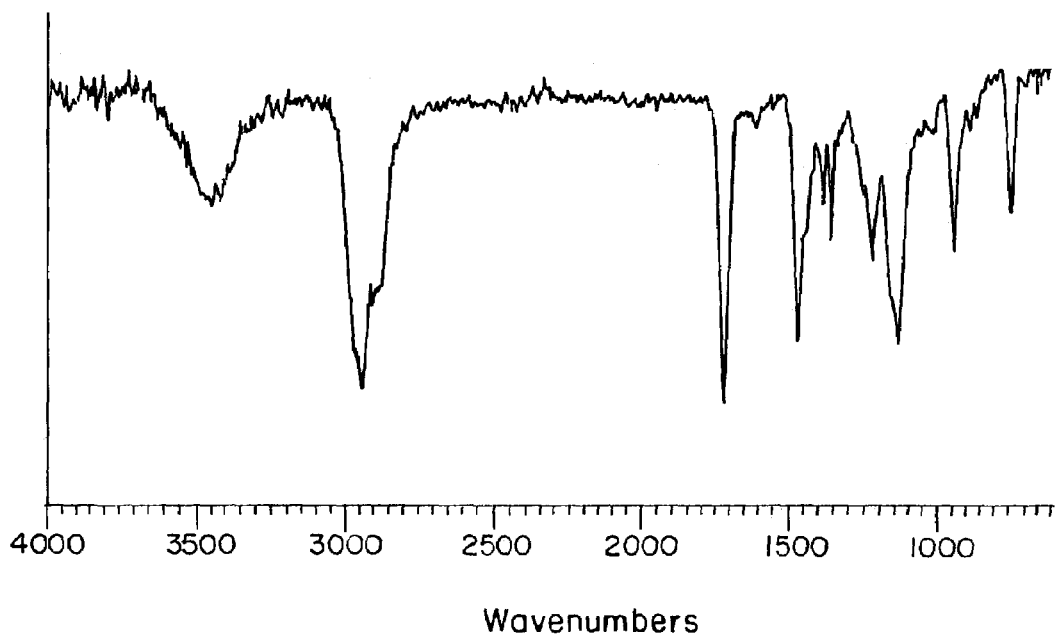

Representative di- and triblocks (PIB(3K)-b-PDMAEMA (3K), PDMAEMA(3K)-b-PIB(9K)-b-PDMAEMA(3K), and PDMAEMA(0.7K)-b-PIB(9K)-b-PDMAEMA (0.7K)) were quaternized to the corresponding cationomers by the procedure described above. The products are yellow and were found to be insoluble in chloroform and THF, good solvents of their precursors. FIG. 15 shows the FTIR spectra of PDMAEMA(3K)-b-PIB(9K)-b-PDMAEMA(3K) and its quaternized salt. After treatment with CH$_3$I, the split peaks at 2820 and 2768 cm$^{-1}$ (C—H stretch of the —N(CH$_3$)$_2$ group) disappear, which suggests essentially complete quaternization.

The PDMAEMA segments of di-and tri-block copolymers were quaternized by CH$_3$I as follows. To a one-neck flask equipped with a condenser and mechanical stirrer were added chloroform solutions of the polymers and 10 molar excess of CH$_3$I, and the charge was refluxed for 30 mins. The yellow products precipitated were washed with chloroform, and vacuum dried at 40° C. until constant weight. Products were characterized by $^1$H NMR in D$_2$O.

PDMAEMA$^+$I$^-$: δ=4.58 ppm (s, 2H,—CO—O—CH$_2$—CH$_2$—N—), δ=3.90 ppm (s, 2H,—CO—O—CH$_2$—CH$_2$—N—), δ=3.35 ppm (s, 9H,—N$^+$—(CH$_3$)$_3$), δ=1.80–2.25 ppm (2H,—CH$_2$—C—), δ=0.85–1.30 ppm (d, 3H,—C—CH$_3$). FTIR (PIB-b-PDMAEMA$^+$I$^-$): 2950,2910, 1729, 1472, 1391, 1366, 1265, 1150, 956 cm$^{-1}$.

Based upon the foregoing disclosure, it should now be apparent that the use of the components described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the described invention.

What is claimed is:

1. An inverse micelle comprising:
a plurality of block copolymer ionomers in a hydrocarbon solvent, the block copolymer ionomers having a polyisobutylene block; and
at least one ionomeric block, wherein the plurality of copolymer ionomer chains spontaneously aggregate such that the charged ionomeric monomers and their counterions form a loosely grouped ionic aggregate, and the polyisobutylene chains extend outward into the hydrocarbon solvent.

2. An endless ionomer network comprising:
a plurality of tri-block copolymer ionomers in a hydrocarbon solvent, the tri-block copolymer ionomers having a polyisobutylene block, and;
at least two ionomers blocks, wherein the plurality of copolymer ionomer chains spontaneously aggregate such that the charged ionomeric monomers and their counterions form a plurality of loosely grouped ionic aggregates, each aggregate having one or more polyisobutylene chains extending outward into the hydrocarbon solvent, and terminating in another such ionic aggregate.

3. A linear block copolymer ionomer comprising:
a block of polyisobutylene; and
at least one ionomeric block connected to the block of polyisobutylene via an organic linker group.

4. The linear block copolymer ionomer according to claim 3 wherein the at least one ionomeric block is a terminal end group.

5. The linear block copolymer ionomer according to claim 3 wherein the at least one ionomeric block comprises an anionomer.

6. The linear block copolymer ionomer according to claim 5 wherein the anionomer comprises an acrylic acid salt.

7. The linear block copolymer ionomer according to claim 6 wherein the acrylic acid salt comprises a poly(methacrylic acid) salt.

8. The linear block copolymer ionomer according to claim 7 wherein the block copolymer ionomer is a polyisobutylene-block-poly(methacrylic acid) salt.

9. The linear block copolymer ionomer according to claim 7 wherein the block copolymer ionomer is poly(methylmethacrylic acid) salt-block-polyisobutylene-block-poly(methylmethacrylic acid) salt.

10. A block copolymer ionomer comprising:
a block of polyisobutylene; and
at least two ionomeric blocks connected to the block of polyisobutylene via at least one organic linker group at least two organic linker groups with at least one ionomeric group connected to the block of polyisobutylene via each of the at least two organic linker groups.

11. The block copolymer ionomer according to claim 10 wherein the at least two ionomer blocks are each terminal end groups.

12. The block copolymer ionomer according to claim 10 wherein the at least two ionomeric blocks each comprise an anionomer.

13. The block copolymer ionomer according to claim 12 wherein the anionomer comprises an acrylic acid salt.

14. The block copolymer ionomer according to claim 13 wherein the acrylic acid salt comprises a poly(methacrylic acid) salt.

15. The block copolymer ionomer according to claim 14 wherein the block copolymerionomer is a polyisobutylene-block-poly(methacrylic acid) salt.

16. The block copolymer ionomer according to claim 14 wherein the block copolymer ionomer is poly(methylmethacrylic acid) salt-block-polyisobutylene-block-poly(methylmethacrylic acid) salt.

* * * * *